United States Patent
Yamada

(10) Patent No.: US 7,353,292 B2
(45) Date of Patent: Apr. 1, 2008

(54) DEVICE AND METHOD FOR CHANGING CONNECTION TYPES BETWEEN A FIXED OR VARIABLE STATE WITH AN EXTERNAL SWITCHING UNIT

(75) Inventor: Hiroshi Yamada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 651 days.

(21) Appl. No.: 10/004,004

(22) Filed: Nov. 28, 2001

(65) Prior Publication Data
US 2002/0042840 A1    Apr. 11, 2002

Related U.S. Application Data

(63) Continuation of application No. PCT/JP99/04075, filed on Jul. 29, 1999.

(51) Int. Cl.
G06F 13/00    (2006.01)
(52) U.S. Cl. ...................................... 709/239
(58) Field of Classification Search ................ 370/351, 370/352, 357, 354; 709/217, 238, 239
See application file for complete search history.

(56) References Cited

U.S. PATENT DOCUMENTS

| | | | | |
|---|---|---|---|---|
| 5,794,796 A | * | 8/1998 | Weisburn | 211/40 |
| 5,873,472 A | * | 2/1999 | Weisburn | 211/41.12 |
| 5,896,544 A | * | 4/1999 | Connelly | 710/3 |
| 6,339,802 B1 | * | 1/2002 | Hefferon et al. | 710/52 |
| 6,597,689 B1 | * | 7/2003 | Chiu et al. | 370/354 |
| 6,665,295 B1 | * | 12/2003 | Burns et al. | 370/389 |

FOREIGN PATENT DOCUMENTS

| | | | |
|---|---|---|---|
| CA | 2255383 | * | 6/2000 |
| JP | 04035252 | | 2/1992 |
| JP | 5-95374 | | 4/1993 |
| JP | 09266480 | | 10/1997 |
| JP | 10028122 | | 1/1998 |
| JP | 10262055 | | 9/1998 |
| JP | 11122247 | | 4/1999 |
| JP | 11154958 | | 6/1999 |

* cited by examiner

Primary Examiner—Robert B Harrell
(74) Attorney, Agent, or Firm—Katten Muchin Rosenman LLP

(57) ABSTRACT

The present invention relates to a connection data change method and device, and a switching unit for changing connection data for a node constituting a network, and includes a connection data management part managing connection data for connection with another switching unit and a change operation part changing the connection data so that the connection with the other switching unit is changed to a fixed connection type or a variable connection type, wherein the change operation part changes the connection with the other switching unit to the variable connection type when the connection is made and to the fixed connection type after the connection is completed.

14 Claims, 27 Drawing Sheets

FIG.8

| CONNECTION MANAGEMENT NUMBER |
|---|
| SELF- LINE NUMBER |
| CONNECTED NODE NUMBER |
| CONNECTION STATUS |
| CONNECTION VP IDENTIFIER |
| CONNECTION VC IDENTIFIER |

| BATCH- CHANGE- ENABLED LINE NUMBER |
|---|
| BATCH CHANGE CONNECTION TYPE<br> 1 : SVC<br> 2 : SPVC |

| AUTOMATIC- CHANGE- ENABLED LINE NUMBER |
|---|
| AUTOMATIC CHANGE CONNECTION TYPE<br>  1 : SVC<br>  2 : SPVC |

| TARGET LINE NUMBER |
|---|
| TARGET CONNECTION TYPE<br>　1 : SVC<br>　2 : SPVC |
| VALID RELEASE REASON |

78

DEVICE AND METHOD FOR CHANGING CONNECTION TYPES BETWEEN A FIXED OR VARIABLE STATE WITH AN EXTERNAL SWITCHING UNIT

This application is a continuation application of, and claims priority under 35 U.S.C. § 120 from, Patent Cooperation Treaty ("PCT") International Patent Application No. PCT/JP99/04075, filed on Jul. 29, 1999 and pending at the filing of this application. The priority application is incorporated herein by reference in its entirety.

TECHNICAL FIELD

The present invention relates to connection data change methods and devices, and switching units, and more particularly to a connection data change method and device, and a switching unit for changing connection data for a node constituting a network.

BACKGROUND ART

Conventionally, a connection between nodes (switching units) constituting an ATM (Asynchronous Transfer Mode) network or a packet switching network is set up by a method such as PVC (Permanent Virtual Connection), SVC (Switched Virtual Connection), or SPVC (Soft Permanent Virtual Connection).

FIGS. 1 is a diagram showing an example configuration for illustrating a connection setup by PVC. In PVC, a network manager sets up connections by inputting setup commands from external input apparatuses 10a through 10d to ATM switching units 14a through 14d, respectively. This connection setup includes setting of connection management data such as port information, VPI (Virtual Path Identifier), VCI (Virtual Channel Identifier), cell rate, band, and service category.

The ATM switching units 14a through 14d each establishes a fixed connection based on the setup commands supplied from the external input apparatuses 10a through 10d, respectively. Set connection management data is maintained.

FIG. 2 is a diagram showing an example configuration for illustrating a connection setup by SVC. In SVC, message signal transmission and reception is performed between each connected ones of ATM switching units 18a through 18d so that the ATM switching units 18a through 18d store route information 20a through 20d, respectively. The connection setup is performed based on the route information.

For instance, a transmitting terminal 16a connected to the transmitting ATM switching unit 18a transmits a SETUP (a call connection request message) storing information such as address of a receiving terminal 16d, band information, and service category through a signal channel for signaling of the SETUP to the receiving terminal 16d connected to the receiving ATM switching unit 18d.

In the case of normal connection, receiving the SETUP, the receiving terminal 16d transmits a CONNECT (a call connection confirmation message) to the transmitting terminal 16a and performs a connecting operation. Thus, according to SVC, a connection is established by a signaling signal that supports switching connection.

SPVC includes PVC and SVC. In SPVC, fixed connections are established between a transmitting terminal and a transmitting ATM switching unit and between a receiving terminal and a receiving ATM switching unit based on setup commands supplied from external input apparatuses. On the other hand, a connection is established between the transmitting and receiving ATM switching units by the transmitting ATM switching unit transmitting a SETUP to the receiving ATM switching unit and the receiving ATM switching unit thereafter transmitting a CONNECT to the transmitting ATM switching unit.

However, PVC requires the network manager to input the connection management data through the external input apparatuses 10a through 10d to the ATM switching units 14a through 14d, respectively, thus costing a lot of time.

In the case of SVC, it is not required to input the connection management data to each of the ATM switching units 18a through 18d. However, if a failure occurs on a network after the connections are established, all the connections set up with respect to the ATM switching units 18a through 18d are released as shown in FIG. 3.

In order to reestablish the connections, it is necessary to perform the connection setup from a stage of storing the route information 20a through 20d in the ATM switching units 18a through 18d. Therefore, SVC requires a predetermined period of time in each connection setup, thus taking time in failure recovery.

Further, as in SVC, it is also required in SPVC to perform the connection setup from the stage of storing the route information in each of the ATM switching units if all the connections are released due to a failure occurring on the network after the connections are established. In this case, there is a problem in that the connections are prevented from being established until the message signal transmission and reception is completed between each connected ones of the ATM switching units so that the route information is stored therein.

SUMMARY OF THE INVENTION

The present invention is made in view of the above-described respects and has an object of providing a connection data change method and device, and a switching unit by which connection management data can be set easily and connections can be established in a shorter period of time in a failure recovery.

In order to achieve the above-described object, the present invention includes a connection data management part managing connection data for connection with another switching unit and a change operation part changing the connection data so that the connection with the other switching unit is changed to a fixed connection type or a variable connection type, wherein the change operation part changes the connection to the other switching unit to the variable connection type when the connection is made, and to the fixed connection type after the connection is completed.

Thus, connection with another switching unit is changeable to a fixed or variable connection type so that the connection can be easily made by changing the connection to the variable connection type and reconnection can be made instantly by changing the connection to the fixed connection type after the connection is completed. Accordingly, the connection with the other switching unit can be made easily and the reconnection can be made in a shorter period of time.

Additionally, the change operation part may change the connection with the other switching unit to the fixed or variable connection type in accordance with a command input from an outside.

Thus, the connection with the other switching unit can be changed to the fixed or variable connection type in accordance with a command input from the outside, resulting in increased convenience.

Additionally, according to the present invention, the connection data change device may include a first detection part detecting the other connected switching unit, a first message compilation part generating a message controlling the change operation part of the other detected switching unit, and a first transmission part transmitting the message to the other detected switching unit.

Thus, a message controlling a change operation part of the other connected switching unit can be transmitted thereto, thereby simplifying a connection between a plurality of switching units. This results in increased convenience.

Additionally, according to the present invention, the connection data change device may further include a first analysis part receiving the message and analyzing contents thereof.

Thus, a message transmitted from another switching unit can be received and the contents of the message can be analyzed so that the change operation part can be controlled in accordance with the contents. Therefore, a connection between a plurality of switching units can be simplified with increased convenience.

Additionally, according to the present invention, the connection data change device may further include a release part changing the connection with the other switching unit from the fixed connection type to the variable connection type and releasing the connection with the other switching unit.

Thus, a release operation can be simplified by changing the connection with the other switching unit from the fixed connection type to the variable connection type in releasing the connection. Accordingly, the release operation of the connection with the other switching unit can be simplified with increased convenience.

Additionally, according to the present invention, the connection data change device may include a second detection part detecting the other connected switching unit, a second message compilation part generating a message controlling the release part of the other detected switching unit, a second transmission part transmitting the message to the other detected switching unit, and a second analysis part receiving the message from the other switching unit and analyzing contents of the message.

Thus, a message controlling the release part of the other connected switching unit can be transmitted thereto. Further, a message transmitted from the other switching unit-can be received and the contents of the message can be analyzed so that the release part can be controlled in accordance with the contents. Accordingly, the release operation of a connection between a plurality of switching units can be simplified with increased convenience.

Additionally, according to the present invention, the connection data change device may further include a release reason storage part storing a valid release reason for releasing the connection with the other switching unit.

Thus, it can be determined with respect to each release reason whether to perform the release operation by storing a valid release reason for releasing the connection with the other switching unit. For instance, in the case of a release reason originating in such a line failure as to disconnect communication only temporarily, the communication becomes performable immediately after a recovery from the failure unless the release operation is performed. Therefore, the disconnection period of the communication can be shortened, thus increasing the convenience of a switching unit.

Further, the present invention may include the steps of extracting connection data for connection with another switching unit and changing the extracted connection data so that the connection with the other switching unit is changed to a fixed connection type or a variable connection type, wherein the connection to the other switching unit is changed to the variable connection type when the connection is made, and to the fixed connection type after the connection is completed.

Furthermore, the present invention includes a connection data management part managing connection data for connection with another switching unit and a change operation part changing the connection data so that the connection with the other switching unit is changed to a fixed connection type or a variable connection type, wherein the change operation part changes the connection to the other switching unit to the variable connection type when the connection is made, and to the fixed connection type after the connection is completed.

Thus, connection with another switching unit is changeable to a fixed or variable connection type so that the connection can be easily made by changing the connection to the variable connection type and reconnection can be made instantly by changing the connection to the fixed connection type after the connection is completed. Accordingly, the connection with the other switching unit can be made easily and the reconnection can be made in a shorter period of time.

Additionally, according to the present invention, the switching unit may further include a first detection part detecting the other connected switching unit, a first message compilation part generating a message controlling the change operation part of the other detected switching unit, a first transmission part transmitting the message to the other detected switching unit, and a first analysis part receiving the message and analyzing contents thereof.

Thus, a message controlling a change operation part of the other connected switching unit can be transmitted thereto, thereby simplifying a connection between a plurality of switching units. Further, a message transmitted from the other switching unit can be received and the contents of the message can be analyzed so that the change operation part can be controlled in accordance with the contents.

Therefore, a connection between a plurality of switching units can be simplified with increased convenience.

Additionally, according to the present invention, the switching unit may include a release part changing the connection with the other switching unit from the fixed connection type to the variable connection type and releasing the connection with the other switching unit and a release reason storage part storing a valid release reason for releasing the connection with the other switching unit.

Thus, a release operation can be simplified by changing the connection with the other switching unit from the fixed connection type to the variable connection type in releasing the connection. Further, it can be determined with respect to each release reason whether to perform the release operation by storing a valid release reason for releasing the connection with the other switching unit.

Accordingly, the release operation of the connection with the other switching unit can be simplified with increased convenience.

BRIEF DESCRIPTION OF THE DRAWINGS

Other objects, features and advantages of the present invention will become more apparent from the following detailed description when read in conjunction with the accompanying drawings, in which:

FIG. 8 is a diagram showing a configuration of dynamic information;

FIG. 18 is a diagram showing a configuration of batch change data;

FIG. 23 is a diagram showing a configuration of automatic change data;

FIG. 30 is a diagram showing a configuration of release reason data.

BEST MODE FOR CARRYING OUT THE INVENTION

A description will now be given, with reference to the accompanying drawings, of embodiments of the present invention.

Figure 1:
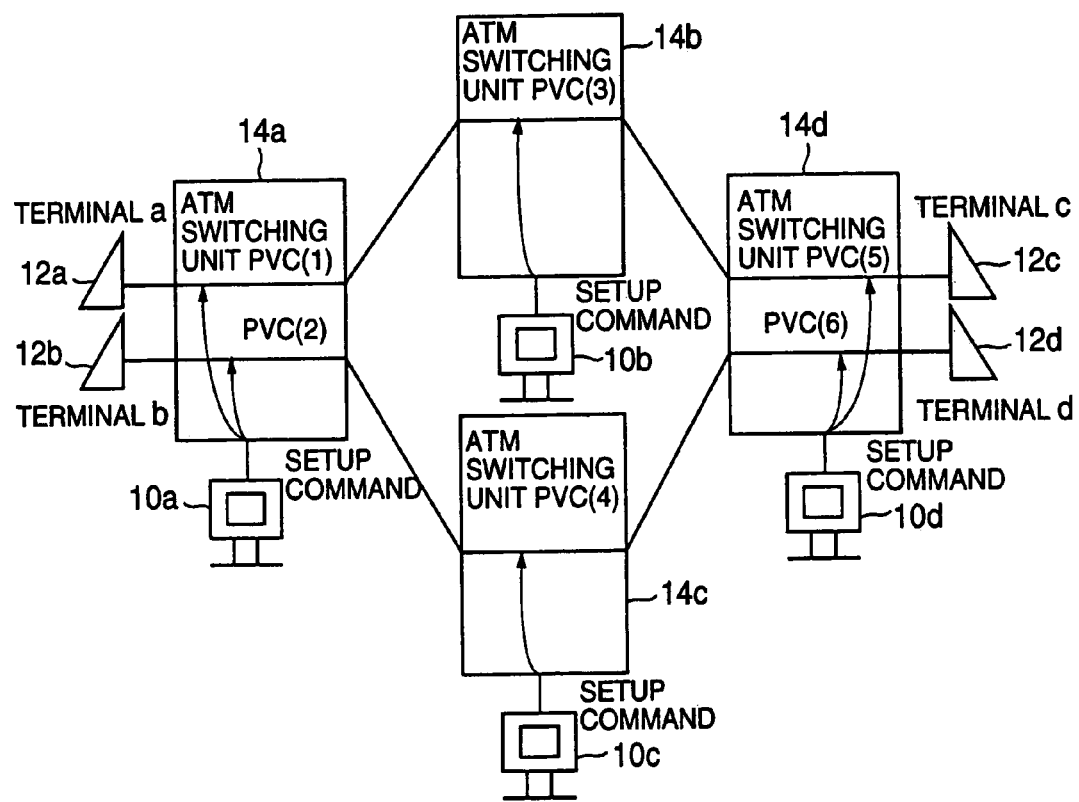
FIG. 1 is a diagram showing an example configuration for illustrating a connection setup by PVC.
Figure 2:
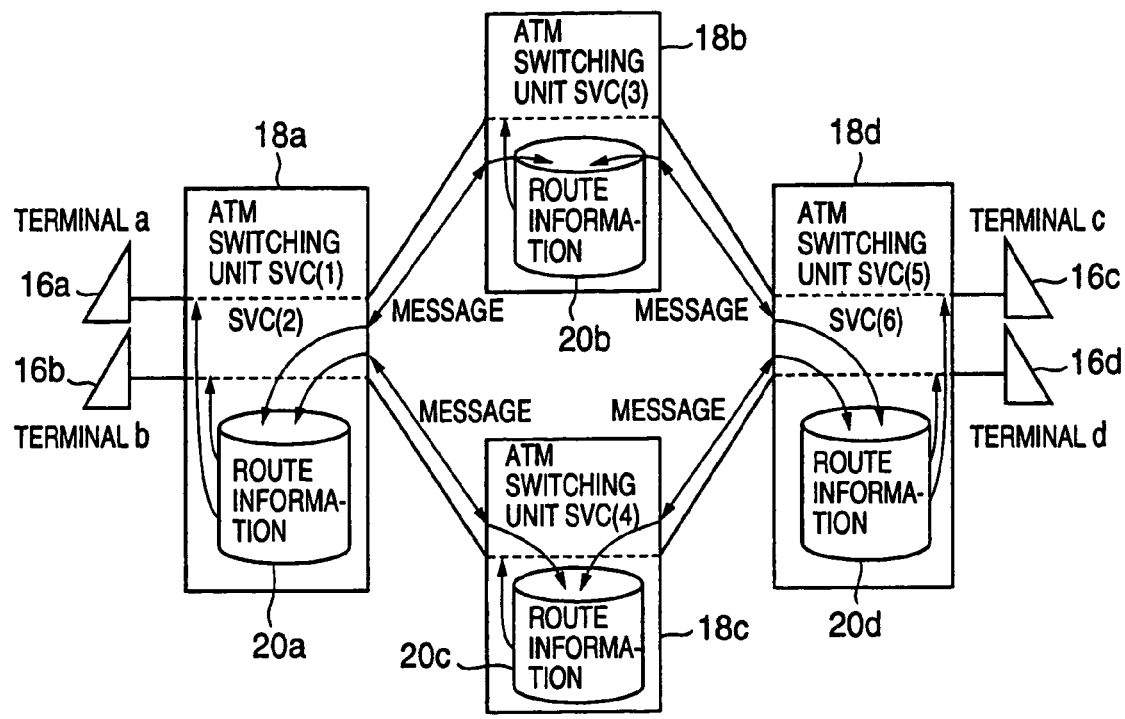
FIG. 2 is a diagram showing an example configuration for illustrating a connection setup by SVC.
Figure 3:
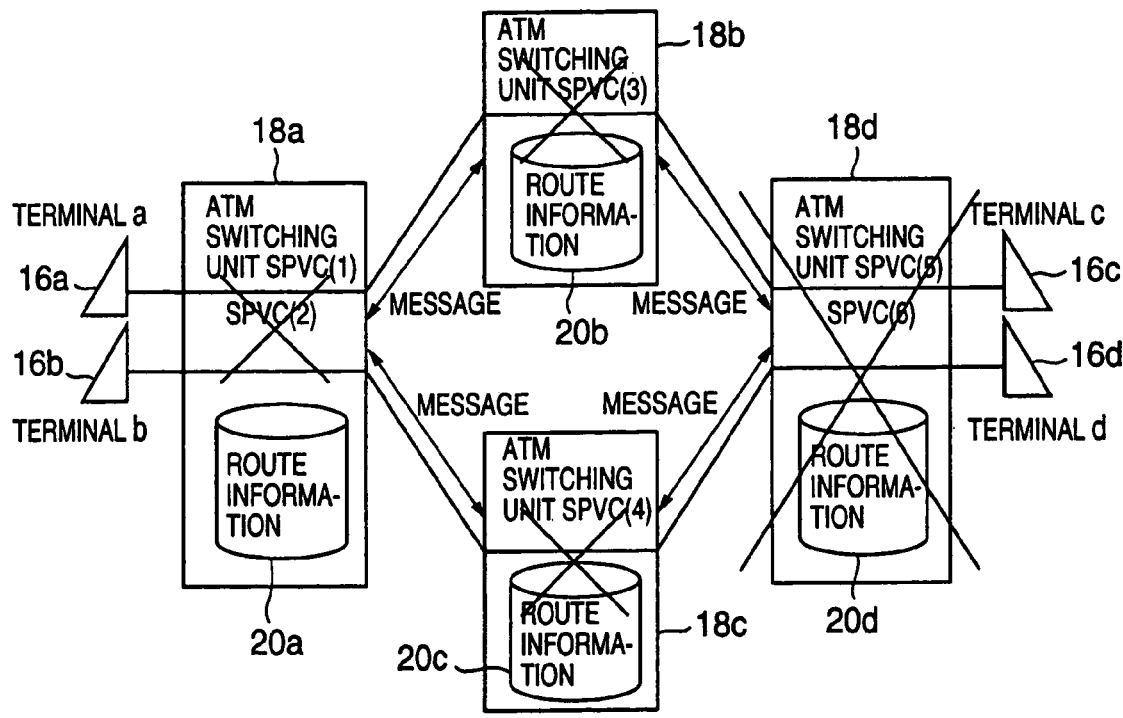
FIG. 3 is a diagram showing an example configuration for illustrating a connection release.
Figure 4:
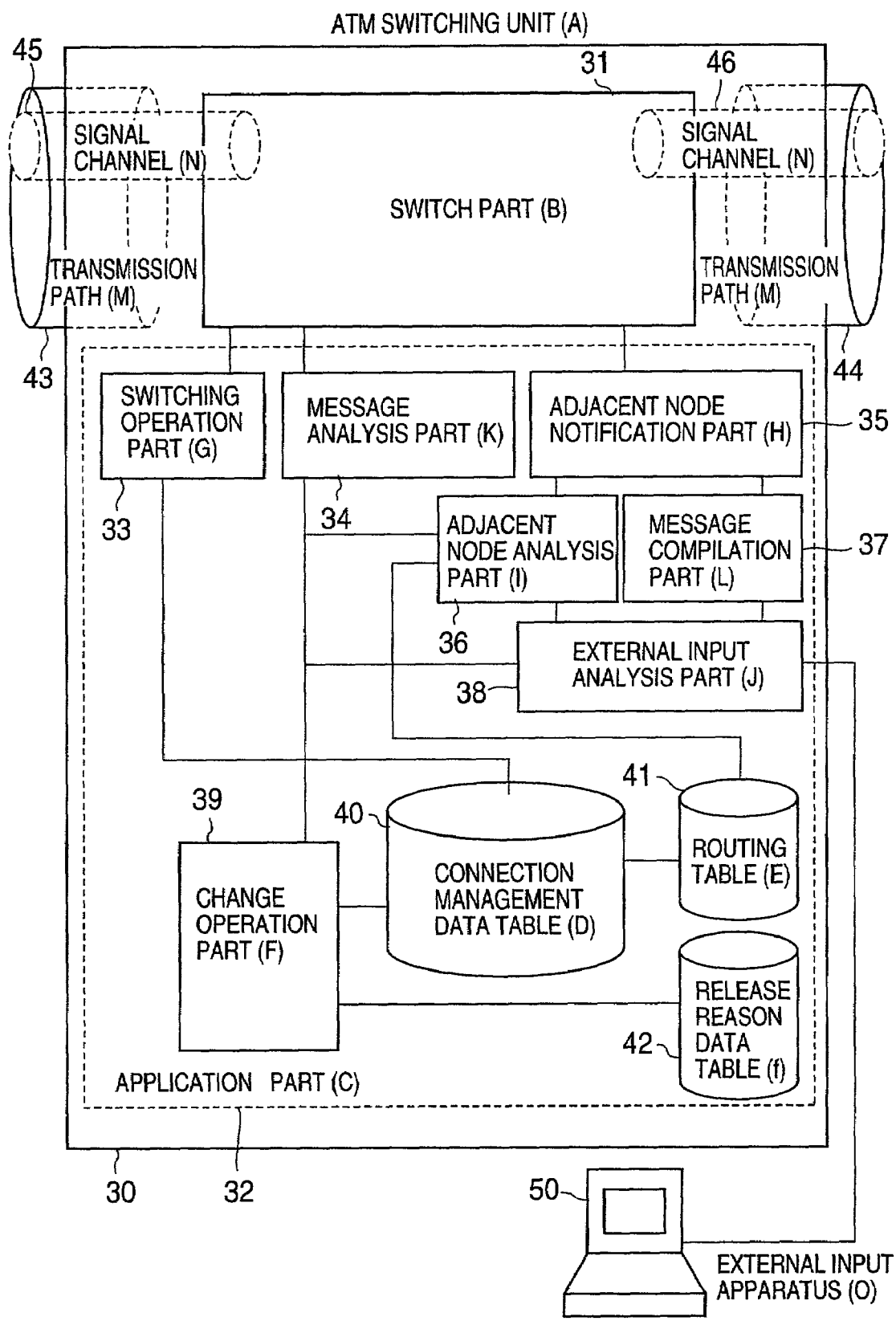
FIG. 4 is a diagram showing a configuration of a switching unit of the present invention.

FIG. 4 is a block diagram showing an embodiment of a switching unit of the present invention. In FIG. 4, a switching unit 30 includes a switch part 31 and an application part 32. The application part 32 includes a switching operation part 33, a message analysis part 34, an adjacent node notification part 35, an adjacent node analysis part 36, a message compilation part 37, an external input analysis part 38, a change operation part 39, a connection management data table 40, a routing table 41, and a release reason data table 42.

The switch part 31 performs routing (a switching operation) on a cell supplied from a transmission path 43 or 44 and transmits the cell to a virtual channel (hereinafter referred to as a VC). The routing table 41 manages routing information on adjacent nodes stored by exchanging message signals with another switching unit. This routing information is used at the time of a connection setup by means of SVC or SPVC.

The connection management data table 40 manages a variety of connections set up in the switching unit 30. The change operation part 39, as will be described later, suitably changes information on a connection type (for instance, SVC) of the connection management data table 40.

The switching operation part 33 performs a connection setup operation and a connection deletion operation in accordance with the connection management data table 40. The adjacent node notification part 35 transmits a later-described connection change request message to the corresponding adjacent node. The adjacent node analysis part 36 analyzes a state of each adjacent node and determines whether to transmit the received connection change request message to the corresponding adjacent node.

The external input analysis part 38, to which an external input apparatus 50 is connected, analyzes a setup command input from the external input apparatus 50, and performs a connection setup operation in accordance with the setup command. The message analysis part 34 analyzes the message signal used for signaling, and, based on the analysis results, requests the change operation part 39 and the adjacent node analysis part 36 to perform operations. The message compilation part 37 edits the contents of the setup command input from the external input apparatus 50 to generate the message signal.

The transmission paths 43 and 44 are physical lines for connection to the adjacent nodes. Signal channels 45 and 46 are VCs multiplexed in the transmission paths 43 and 44, respectively. The signal channels 45 and 46 are signaling connections for communicating the message signal for signaling. The release reason data table 42 is release reason data entered by a network manager, and recorded with release reasons that are made valid when a connection release operation is performed.

Figure 5:
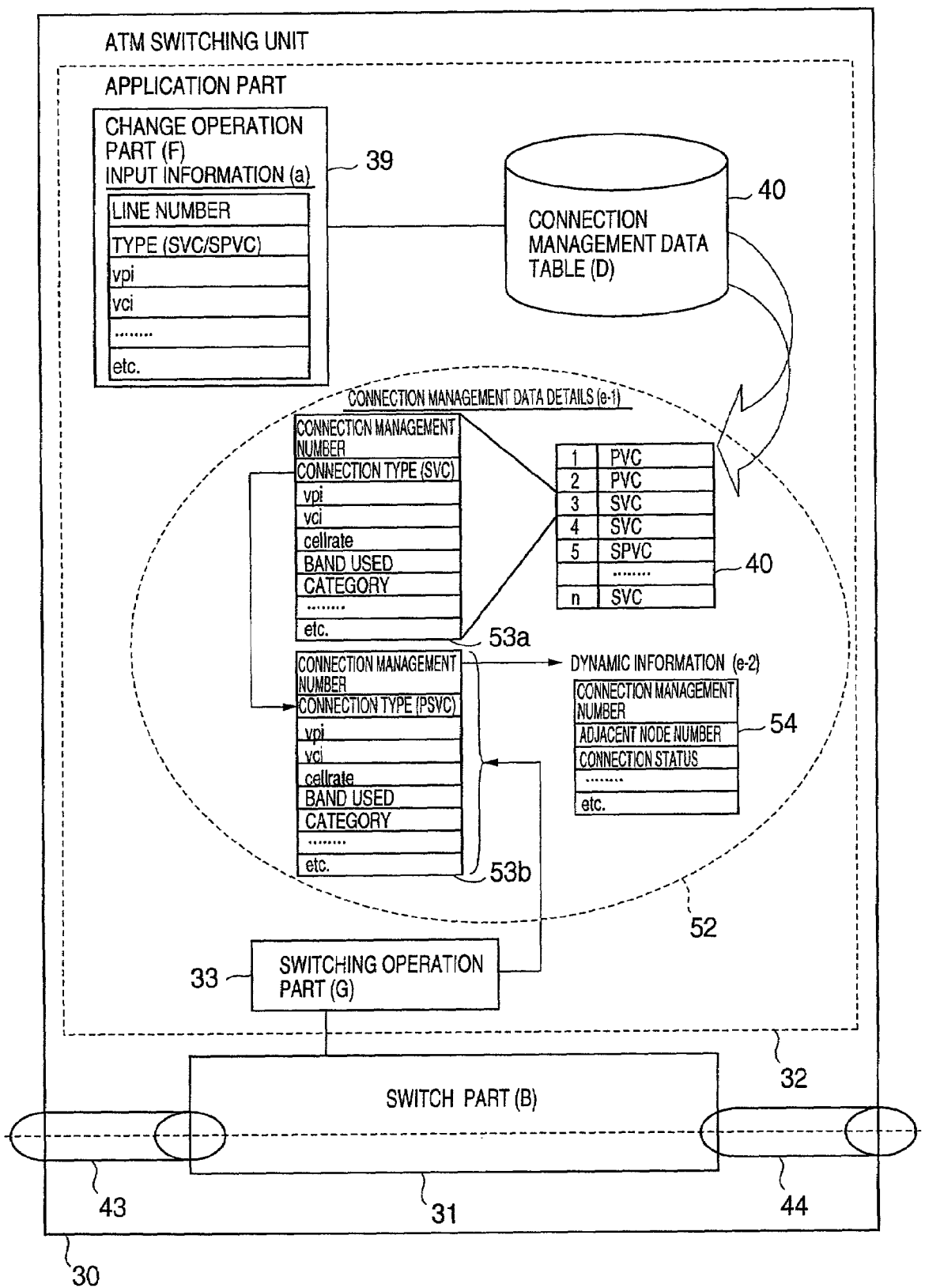
FIG. 5 is a diagram for illustrating a first embodiment of the switching unit of the present invention.

Next, a description will be given, with reference to FIGS. 5 through 10, of a first embodiment of the present invention. FIG. 5 is a diagram for illustrating the first embodiment of the switching unit of the present invention. The switching unit 30 of FIG. 5 has the same configuration as the switching unit of FIG. 4, and has its essential parts for illustrating the first embodiment shown in the drawing.

Figure 6:
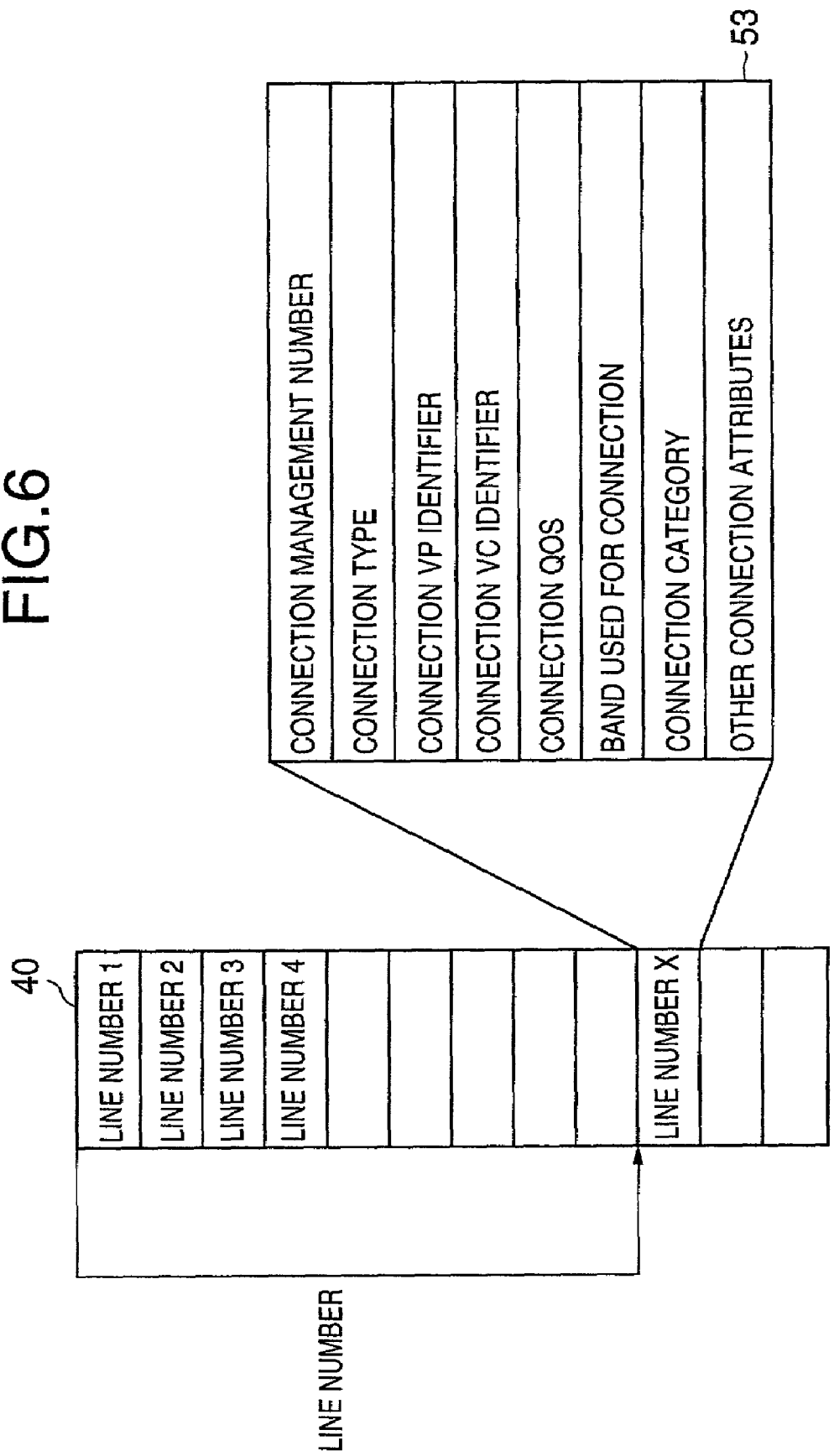
FIG. 6 is a diagram showing a configuration of a connection management data table.

The connection management data table 40 of FIG. 5 has a configuration shown in FIG. 6. FIG. 6 is a diagram showing the configuration of the connection management data table 40. In FIG. 6, connection management data 53 is set for each line number in the connection data management table 40.

The connection management data 53 includes a connection management number, a connection type, a connection VP identifier, a connection VC identifier, connection QOS, a band used for connection, a connection category, and other connection attributes.

The present invention enables a connection setup that has the advantages of both PVC that is a static connection and SVC/SPVC that is a dynamic connection by suitably changing the connection type from the dynamic connection that is set up dynamically to the static connection that is set up statically. Hereinafter, this connection setup is referred to as a PSVC (Permanent Switched Virtual Connection).

Figure 7:
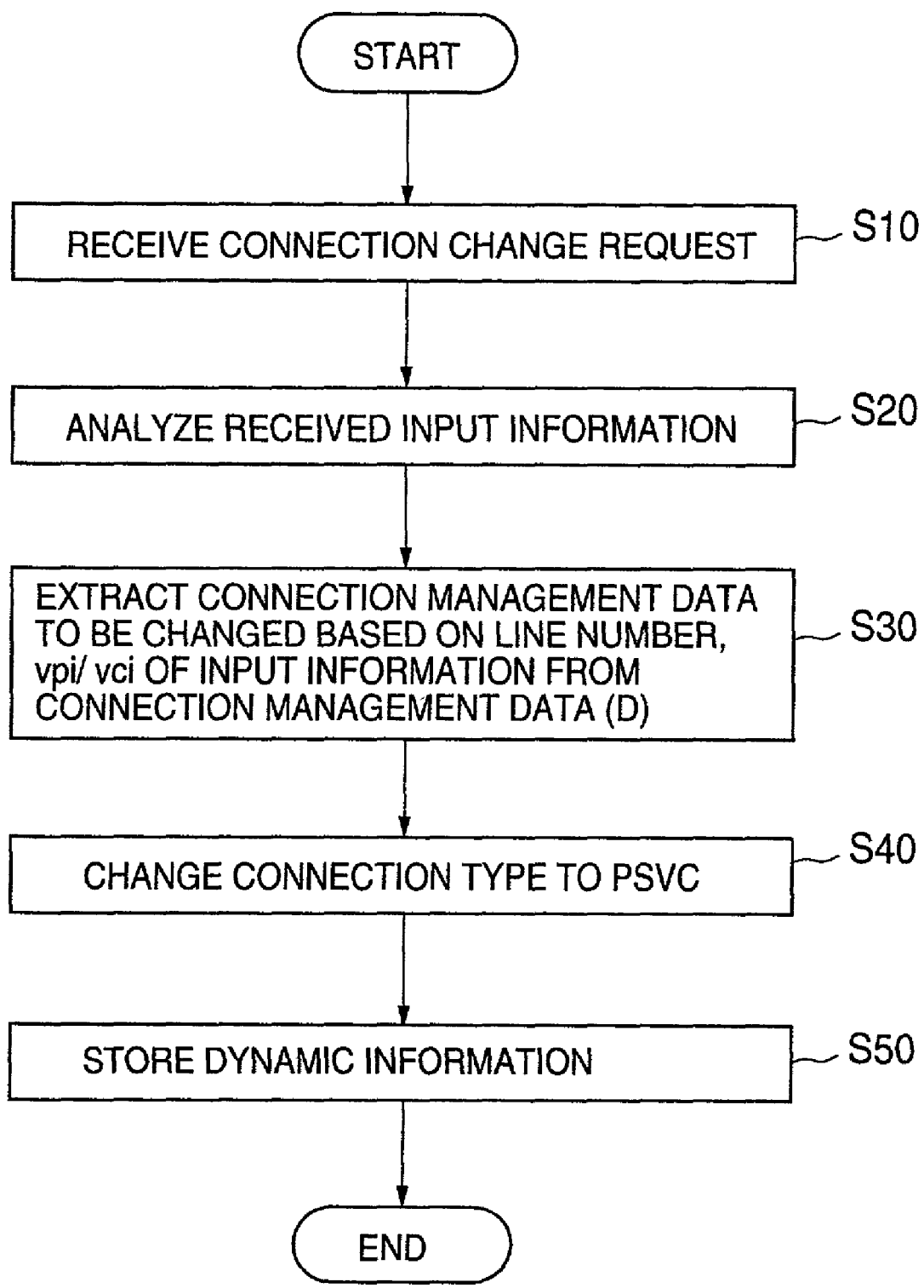
FIG. 7 is a flowchart of an operation process at a time of a connection change.

A description will be given below, in accordance with the flowchart of FIG. 7, of an operation of the switching unit 30 of FIG. 5 at the time of a connection change. FIG. 7 is a flowchart of an operation process at the time of the connection change.

In step S10, the message analysis part 34 receives a connection change request, and the operation proceeds to step S20. In step S20, the message analysis part 34 analyzes the received connection change request, generates input information (line number, VPI, VCI, etc.) for connection change, and supplies the input information to the change operation part 39.

In step S30, supplied with the input information for connection change, the change operation part 39 extracts connection management data 53*a* of corresponding line numbers from the connection data management table 40.

In step S40 after step S30, a connection type included in the extracted connection management data 53*a* is changed from SVC/SPVC that is a dynamic connection to PSVC that is a static connection. Connection management data 53*b* is connection management data where the connection type is changed from SVC/SPVC that is a dynamic connection to PSVC that is a static connection.

In step S50 after step S40, dynamic information 54 of FIG. 8 set in SVC/SPVC that is a dynamic connection is stored.

FIG. 8 is a diagram showing a configuration of the dynamic information 54. The dynamic information 54 includes a connection management number, a self-line number, a connected node number, connection status, a connection VP identifier, and a connection VC identifier.

As above described, an operation process at the time of a static connection change can be realized by an operation process at the time of a dynamic connection change, thus simplifying an operation at the time of a connection change.

Next, a description will be given, in accordance of the flowchart of FIG. 10, of an operation of a network of FIGS. 9A and 9B at the time of a connection reset. FIG. 10 is a flowchart of an operation process at the time of the connection reset.

Figure 9A:
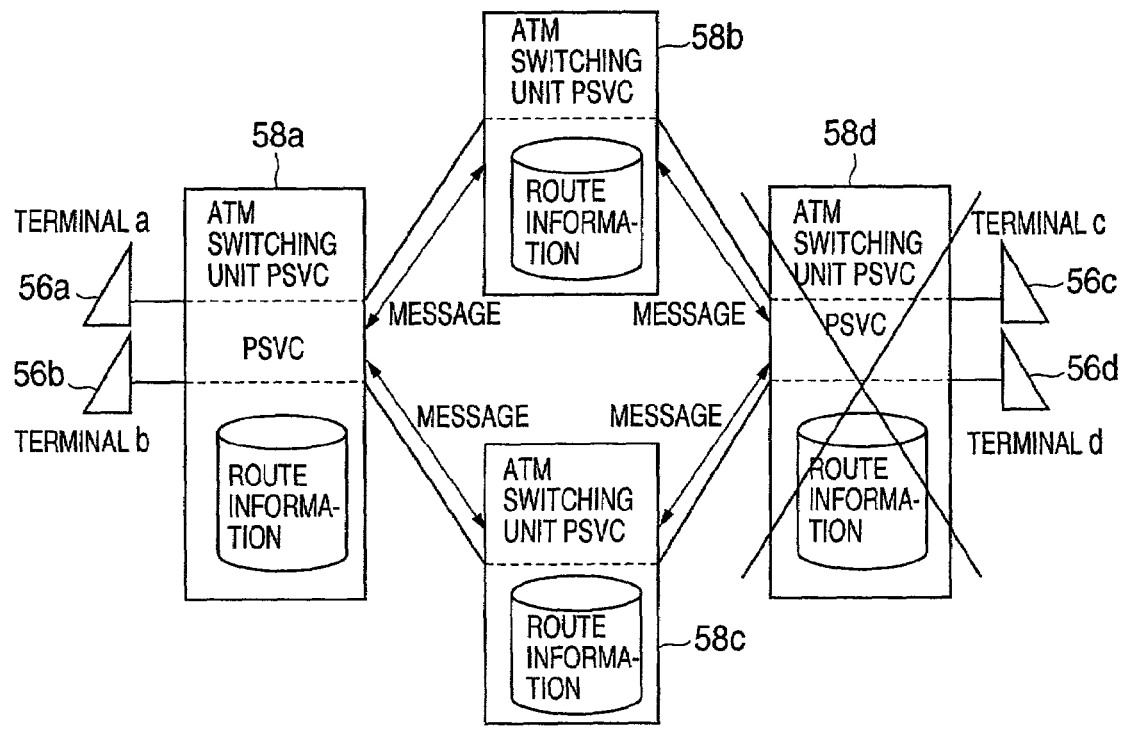
FIGS. 9A and 9B are diagrams showing a network configuration for illustrating an operation at a time of a connection reset.
Figure 9B:
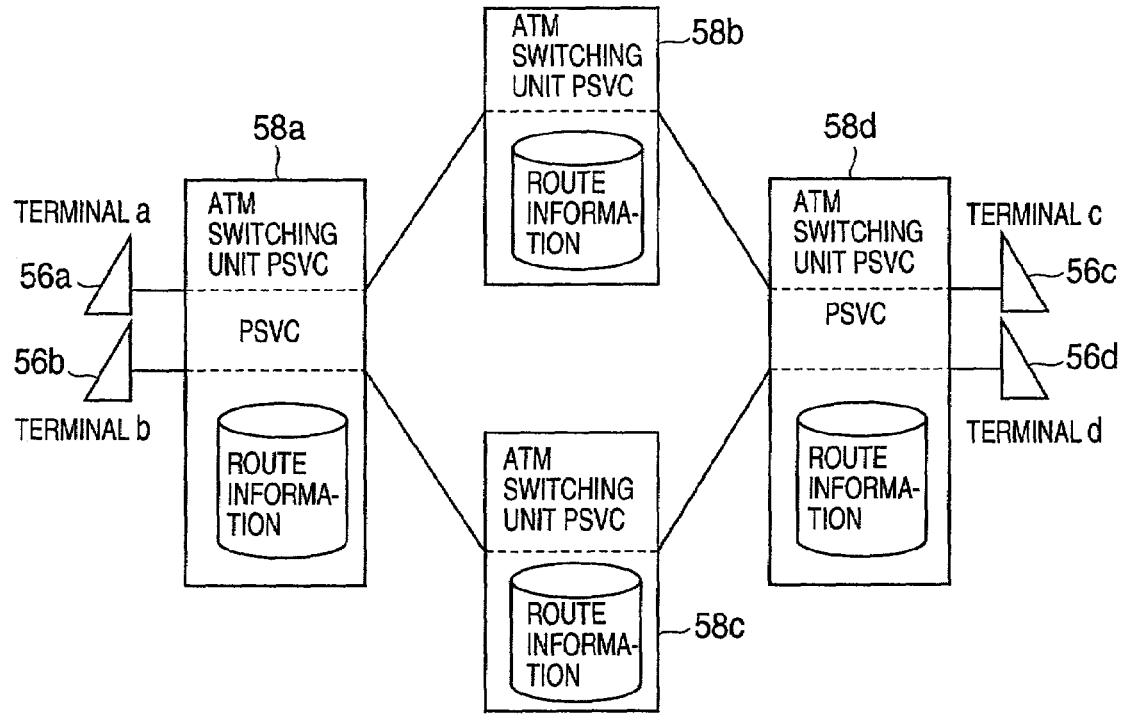
Figure 10:
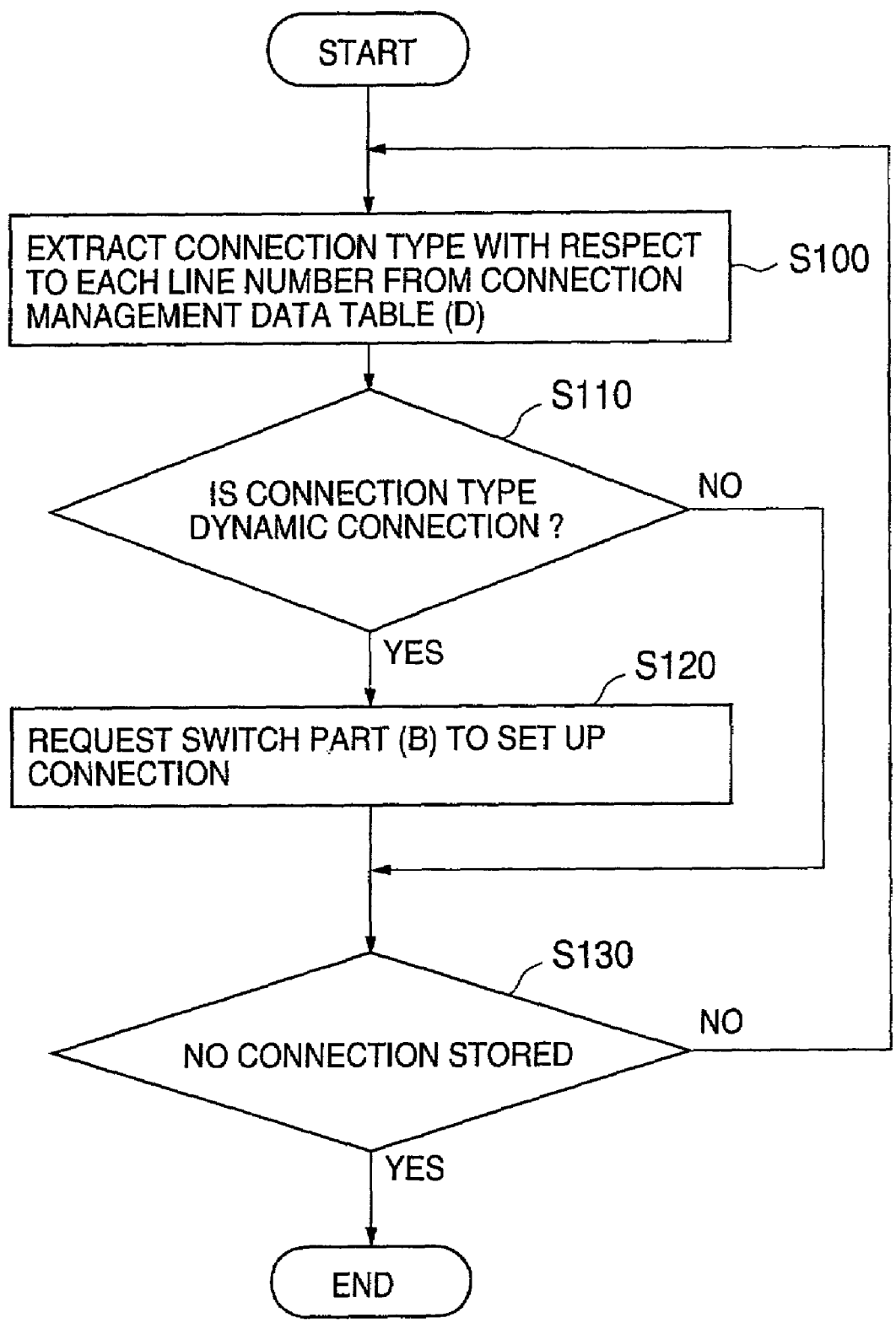
FIG. 10 is a flowchart of an operation process at a time of the connection reset.

As shown in FIG. 9A, if the connections of a switching unit 58*d* are released due to occurrence of a failure on the network after the connections are established, the switching unit 58*d* requires the connections to be reset.

In step S100, the switching unit 58*d* extracts the connection type of the line of each line number from the connection management data table 40. In step S110 after step S100, the switching unit 58*d* determines whether the extracted connection type is a dynamic connection.

If the switching unit 58*d* determines that the extracted connection type is a dynamic connection (YES in S110), step S120 is entered. If the switching unit 58*d* determines that the extracted connection type is not a dynamic connection (NO in S110), step S130 is entered.

In step S120, since the extracted connection type is a dynamic connection, the switch part 31 is requested to set up the connections, and the connections are set up from a stage of storing the route information.

On the other hand, in step S130, since the extracted connection type is not a dynamic connection, the connections are reset by referring to the connection-management data stored in the connection management data table 40. Here, if the connection type is PSVC, the connections are reset as shown in FIG. 9B by referring to the connection management data 53 without waiting for the route information to be stored.

Therefore, if the connection type is PSVC, the connections can be established in a shorter period of time than in the case of SVC or SPVC that is a dynamic connection since the connections are reset in accordance with the connection management data 53.

Figure 11:
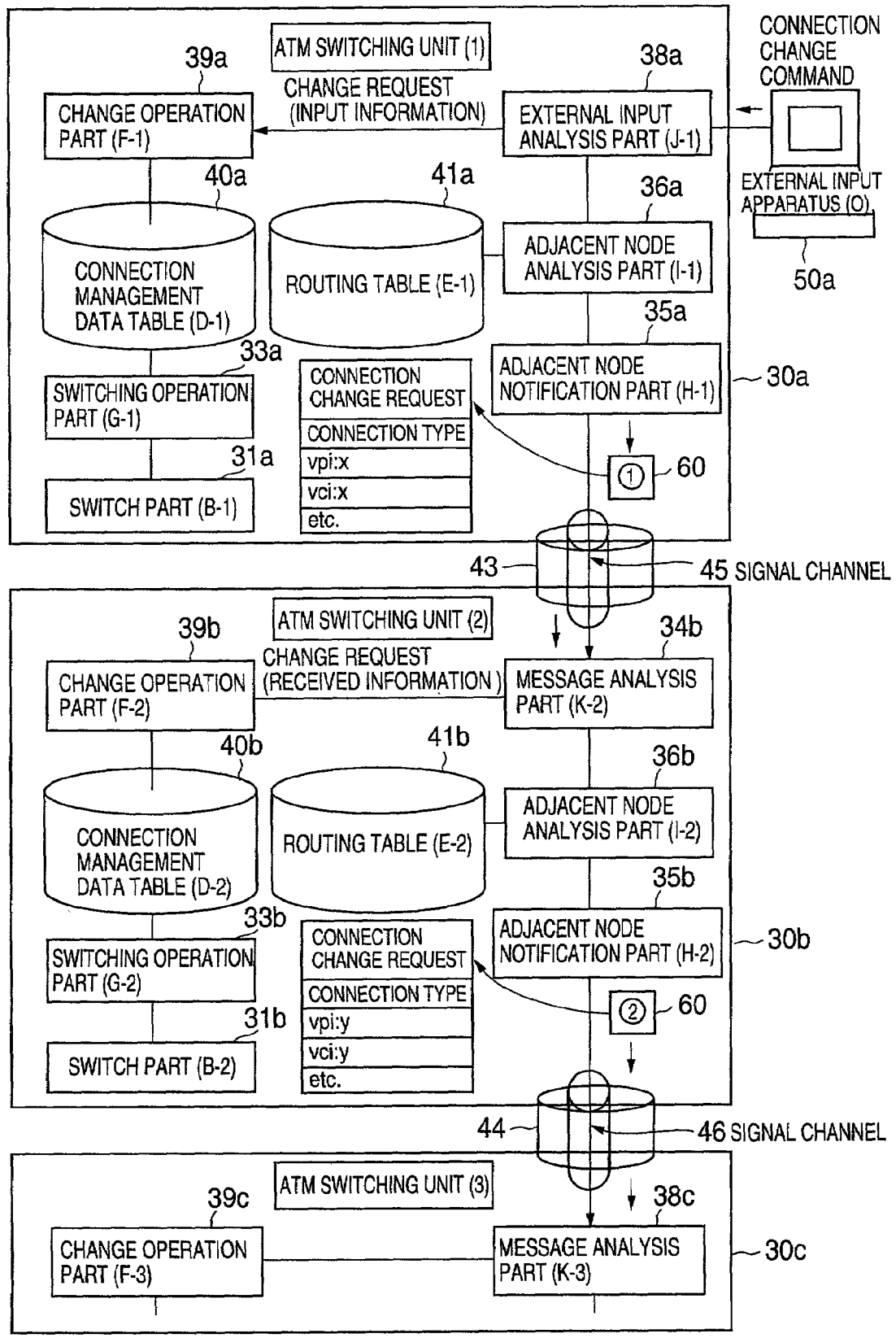
FIG. 11 is a diagram for illustrating a second embodiment of the switching unit of the present invention.

Next, a description will be given, with reference to FIGS. 11 through 13, of a second embodiment of the present invention. FIG. 11 is a diagram for illustrating the second embodiment of the switching unit of the present invention. Each of switching units 30*a* through 30*c* has the same configuration as the switching unit of FIG. 4, and has its necessary parts for illustrating the second embodiment shown in the drawing.

Here, a description will be given, in accordance with the flowchart of FIG. 12, of operations performed by the switching units 30*a* through 30*c* when a connection change request is made. FIG. 12 is a flowchart of an operation process performed when the connection change request is made.

In step S150, a connection change request is input from an external input apparatus 50*a* connected to the switching unit 30*a* with a dynamic connection to be changed being specified. The connection change request input to the external input apparatus 50*a* is supplied to an external input analysis part 38*a*.

In step S160 after step S150, the external input analysis part 38*a* analyzes the supplied connection change request, and supplies information on the analysis results to a change operation part 39*a*.

In step S170 after step S160, the change operation part 39*a* extracts from a connection management data table 40*a* the connection management data 53 of a corresponding line number in accordance with the supplied information on the analysis results.

In step S180 after step S170, the change operation part 39*a* change a connection type included in the extracted connection management data 53 from a dynamic connection to PSVC that is a static connection. In step S190 after step S180, the dynamic information 54 of FIG. 8 set in SVC/SPVC that is a dynamic connection is stored.

In step S200, adjacent node information is extracted based on the routing information of a routing table 41*a*. In step S210 after step S200, an adjacent node analysis part 36*a* determines based on the extracted adjacent node information whether the switching unit 30*a* has an adjacent node.

If the adjacent node analysis part 36*a* determines that the switching unit 30*a* has an adjacent node (YES in S210), the adjacent node analysis part 36*a* supplies information to that effect to an adjacent node notification part 35*a* and the operation of step S220 is performed. If the adjacent node analysis part 36a determines that the switching unit 30a has no adjacent node (NO in S210), the operation is terminated.

In step S220, the adjacent node notification part 35a supplies the connection change request to the adjacent node (the switching unit 30b in FIG. 11, for instance) through the signal channel 45. The connection change request supplied from the adjacent node notification part 35a has a configuration shown in FIG. 13.

Figure 13:
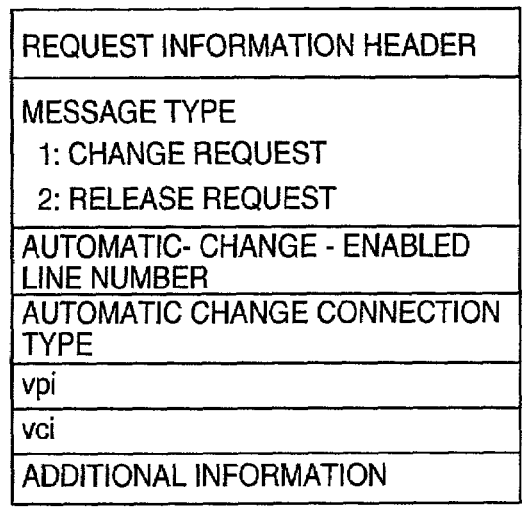
FIG. 13 is a diagram showing a configuration of the connection change request.

FIG. 13 is a diagram showing a configuration of the connection change request. In FIG. 13, a connection change request 60 includes a request information header, a message type, an automatic-change-enabled line number, an automatic change connection type, a connection VP identifier, a connection VC identifier, and additional information.

The switching unit 30b receives the connection change request 60 in a message analysis part 34b. The message analysis part 34b analyzes the supplied connection change request 60 and supplies information on the analysis results to a change operation part 39b.

Thereafter, through the same operations as steps S170 through S190, the connection management data 53 of corresponding line numbers is extracted from a connection management data table 40b in accordance with the infonnation on the analysis results, and the connection management data 53 is altered. Further, through the same operations as steps S200 through S220, it is determined whether the switching unit 30b has an adjacent node, and if it is determined that the switching unit 30b has an adjacent node (the switching unit 30c in FIG. 11, for instance), the connection change request 60 is supplied to the switching unit 30c through the signal channel 46.

Accordingly, the setting of the connection management data 53 for a plurality of nodes can be simplified with increased convenience.

Figure 14:
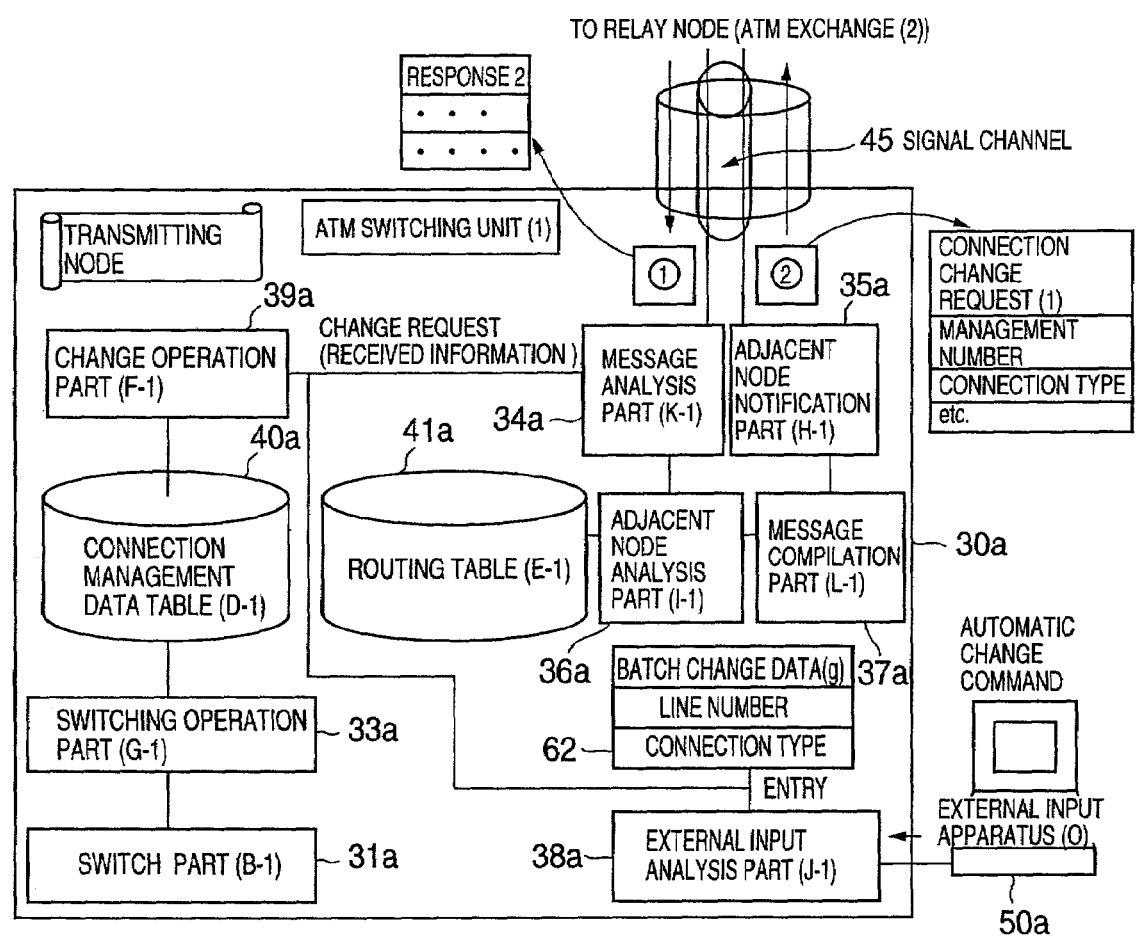
FIG. 14 is a diagram for illustrating a third embodiment of the switching unit of the present invention.
Figure 15:
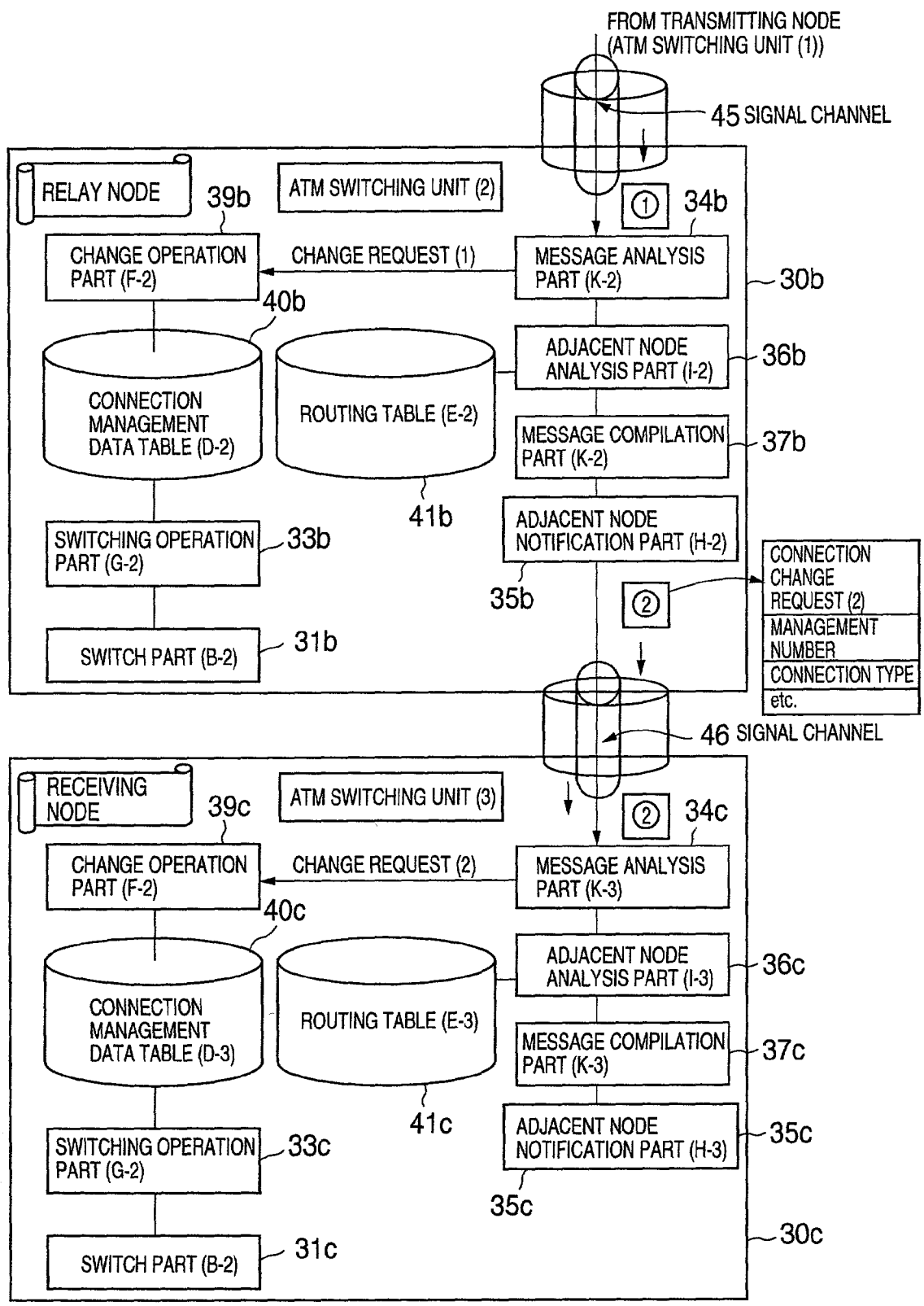
FIG. 15 is a diagram for illustrating the third embodiment of the switching unit of the present invention.

Next, a description will be given, to FIGS. 14 through 18 of a third embodiment of the present invention. FIGS. 14 and 15 are diagrams for illustrating the third embodiment of the switching unit of the present invention. Each of the switching units 30a through 30c of FIGS. 14 and 15 has the same configuration as the switching unit of FIG. 4, and has its necessary parts for illustrating the third embodiment shown in the corresponding drawing.

Figure 16:
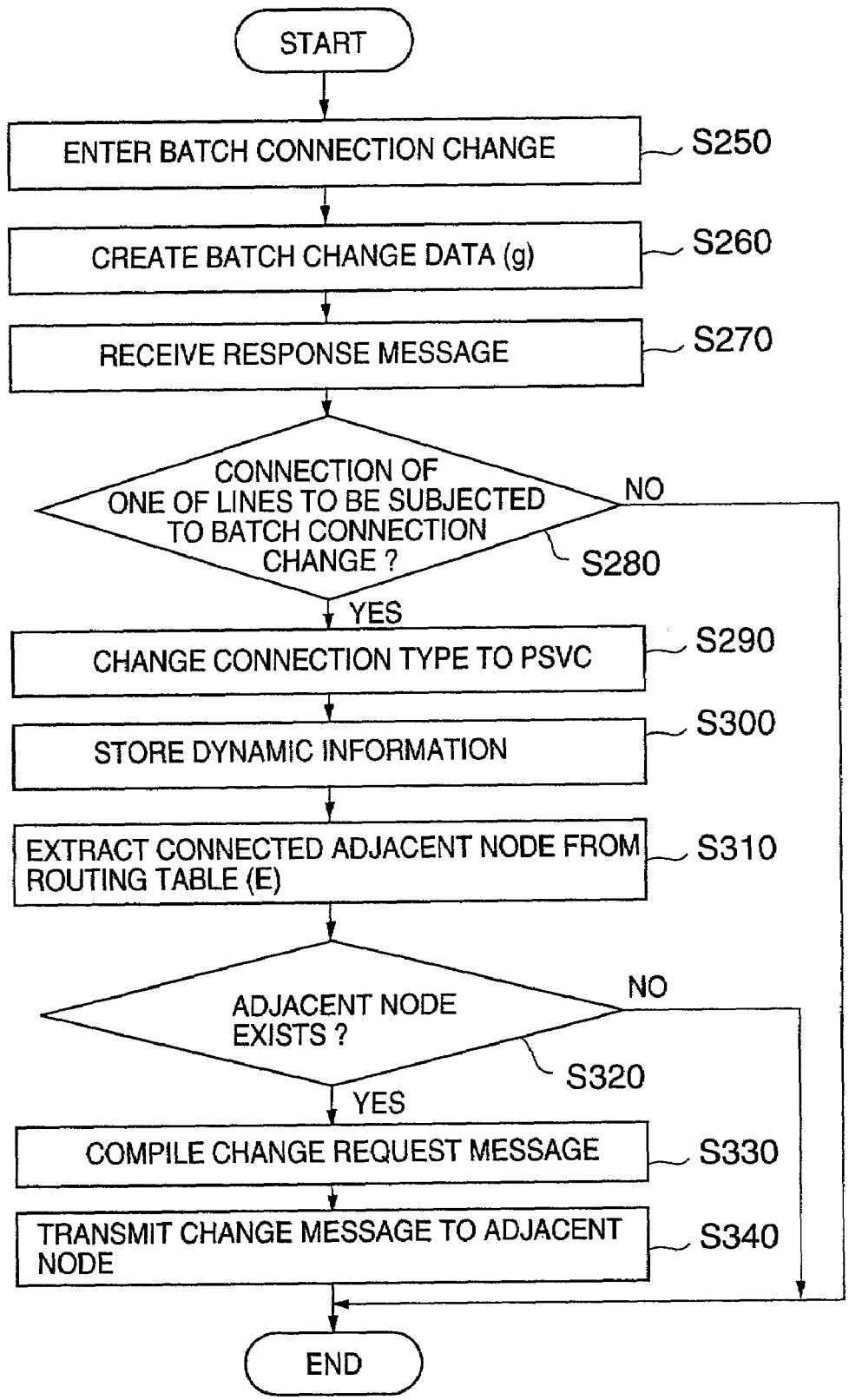
FIG. 16 is a flowchart of an operation process of a batch connection change.

Here, a description will be given, in FIGS. 14 and 15 are diagrams for illustrating the third accordance with the flowchart of FIG. 16, of operations performed by the switching units 30a through 30c when a batch connection change is performed. FIG. 16 is a flowchart of an operation process of the batch connection change. The switching unit 30a of FIG. 14 is connected via the signal channel 45 to the switching unit 30b of FIG. 15.

In step S250, a batch connection change is entered from the external input apparatus 50a connected to the switching unit 30a. In step S260 after step S250, batch change data 62 as shown in FIG. 18 is created and entered.

FIG. 18 is a diagram showing a configuration of the batch change data 62. The batch change data 62 includes a batch-change-enabled line number and a batch change connection type. For instance, the batch change connection type is SVC and SPVC in the batch change data 62 of FIG. 18.

Figure 17:
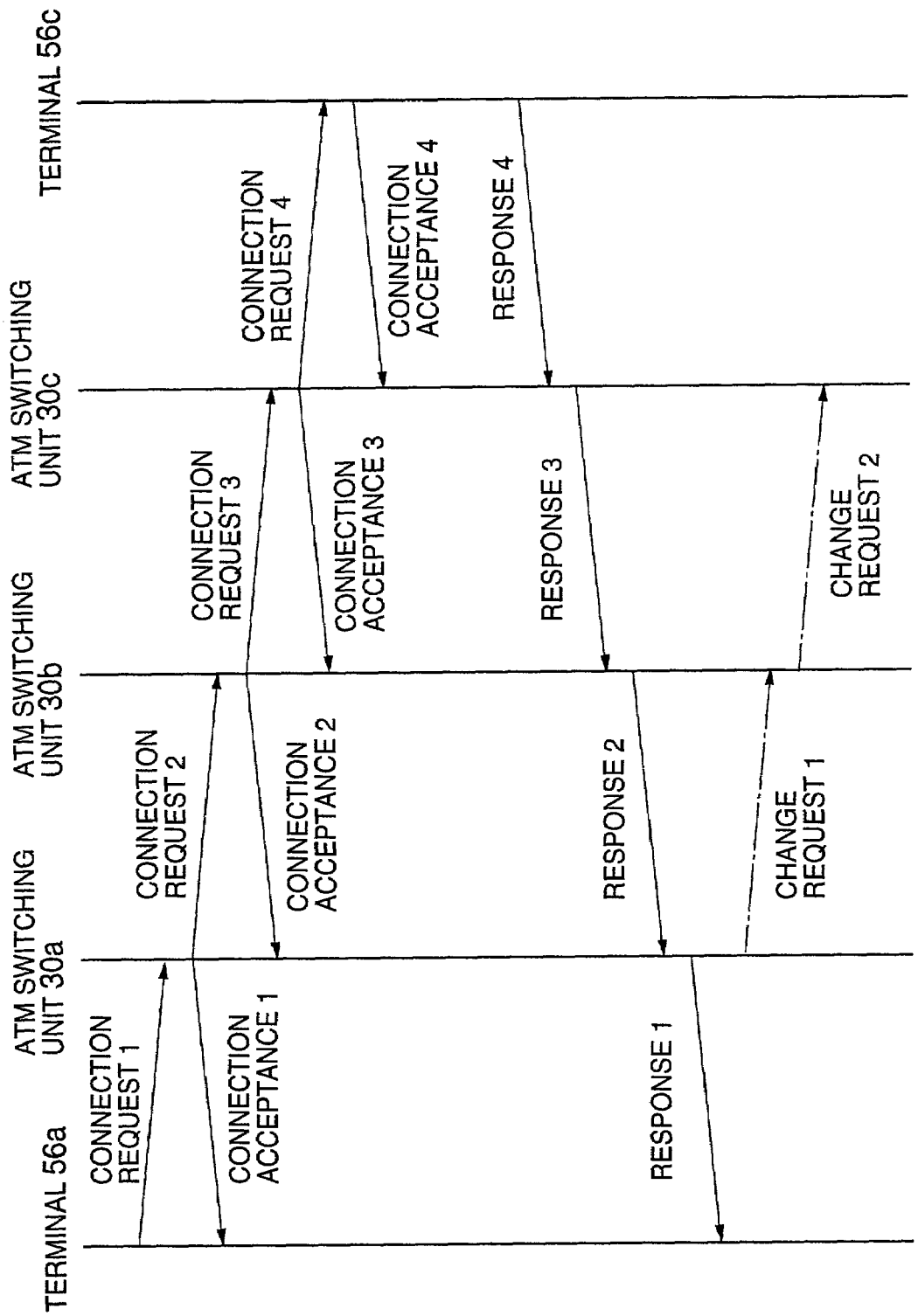
FIG. 17 is a diagram showing a sequence drawing for illustrating an operation process of the batch connection change.

In step S270 after step S260, a connection operation for establishing connections by SVC/SPVC is performed. The operation of step S270 is performed, for instance, in accordance with the procedure of a sequence drawing shown in FIG. 17. FIG. 17 is a diagram showing a sequence drawing for illustrating an operation process of the batch connection change.

In the case of establishing connections between terminals 56a and 56b, a connection request (a call connection request message) is transmitted from the terminal 56a via the switching units 30a through 30c to the terminal 56c so that the connection operation is performed. In the case of normal connection, the terminal 56c transmits a response message (a call connection confirmation message) via the switching units 30a through 30c to the terminal 56a. Therefore, the switching unit 30a receives the response message from the switching unit 30b.

In step S280 after step S270, the switching unit 30a detects the response message supplied from the switching unit 30b in a message analysis part 34a, and determines whether a line number relating to the connection operation is identical to the batch-change-enabled line number included in the batch change data.

If the switching unit 30a determines that the line number relating to the connection operation is identical to the batch-change-enabled line number included in the batch change data (YES in S280), step S290 is entered. If the switching unit 30a determines that the line number relating to the connection operation is not identical to the batch-change-enabled line number included in the batch change data (NO in S280), the operation is terminated.

In step S290, a connection type included in the connection management data 53 of the line number is changed to PSVC. In step S300 after S290, the dynamic information 54 set in SVC/SPVC that is a dynamic connection is stored.

In step S310 after step S300, adjacent node information is extracted based on the routing information of the routing table 41a. In step S320 after step S310, the adjacent node analysis part 36a determines based on the extracted adjacent node information whether the switching unit 30a has an adjacent node.

If the adjacent node analysis part 36a determines that the switching unit 30a has an adjacent node (YES in S320), the adjacent node analysis part 36a supplies information to that effect to a message compilation part 37a, and the operation of step S330 is performed. If the adjacent node analysis part 36a determines that the switching unit 30a has no adjacent node (NO in S320), the operation is terminated.

In step 5330, the message compilation part 37a edits the connection change request message 60 to be transmitted to the adjacent node, and supplies the connection change request message 60 to the adjacent node notification part 35a. Then, in step 5340 after step S330, the adjacent node notification part 35a supplies the connection change request message 60 to the adjacent node of the switching unit 30b.

Figure 12:
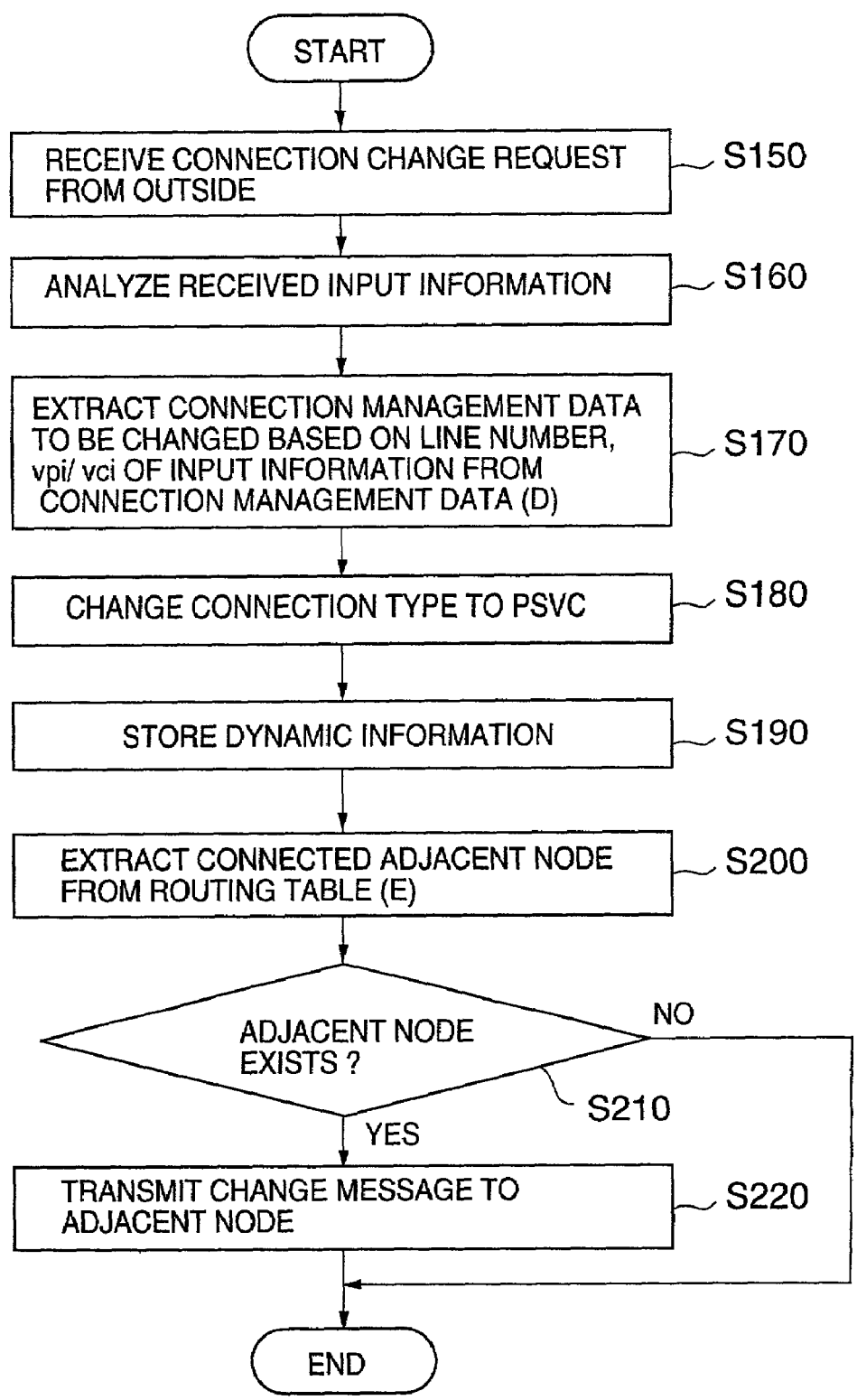
FIG. 12 is a flowchart of an operation process performed when a connection change request is made.

In switching unit 30b, through the same operations as steps S170 through S190 of FIG. 12, the connection management data 53 of corresponding line numbers is extracted from the connection management data table 40b in accordance with the information on the supplied analysis results so that the connection management data 53 is altered.

Further, through the same operations as steps S200 through S220 of FIG. 12, it is determined whether the switching unit 30b has an adjacent node, and if the switching unit 30b has an adjacent node, the connection change request message is supplied via the signal channel 46 to the switching unit 30c.

Accordingly, a batch connection change operation can be performed on a plurality of nodes and the setting of the connection management data 53 can be simplified with increased convenience.

Figure 19:
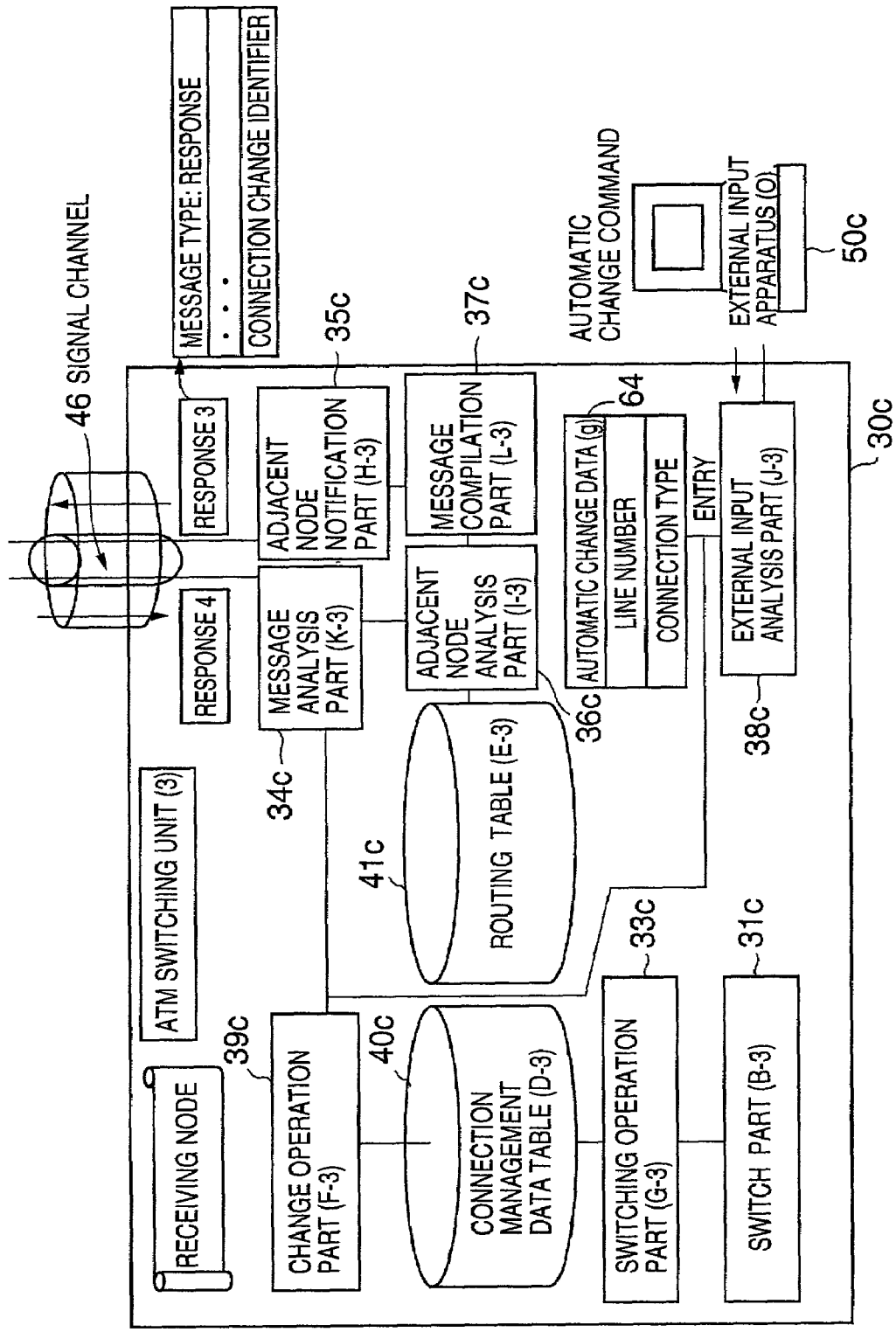
FIG. 19 is a diagram for illustrating a fourth embodiment of the switching unit of the present invention.
Figure 20:
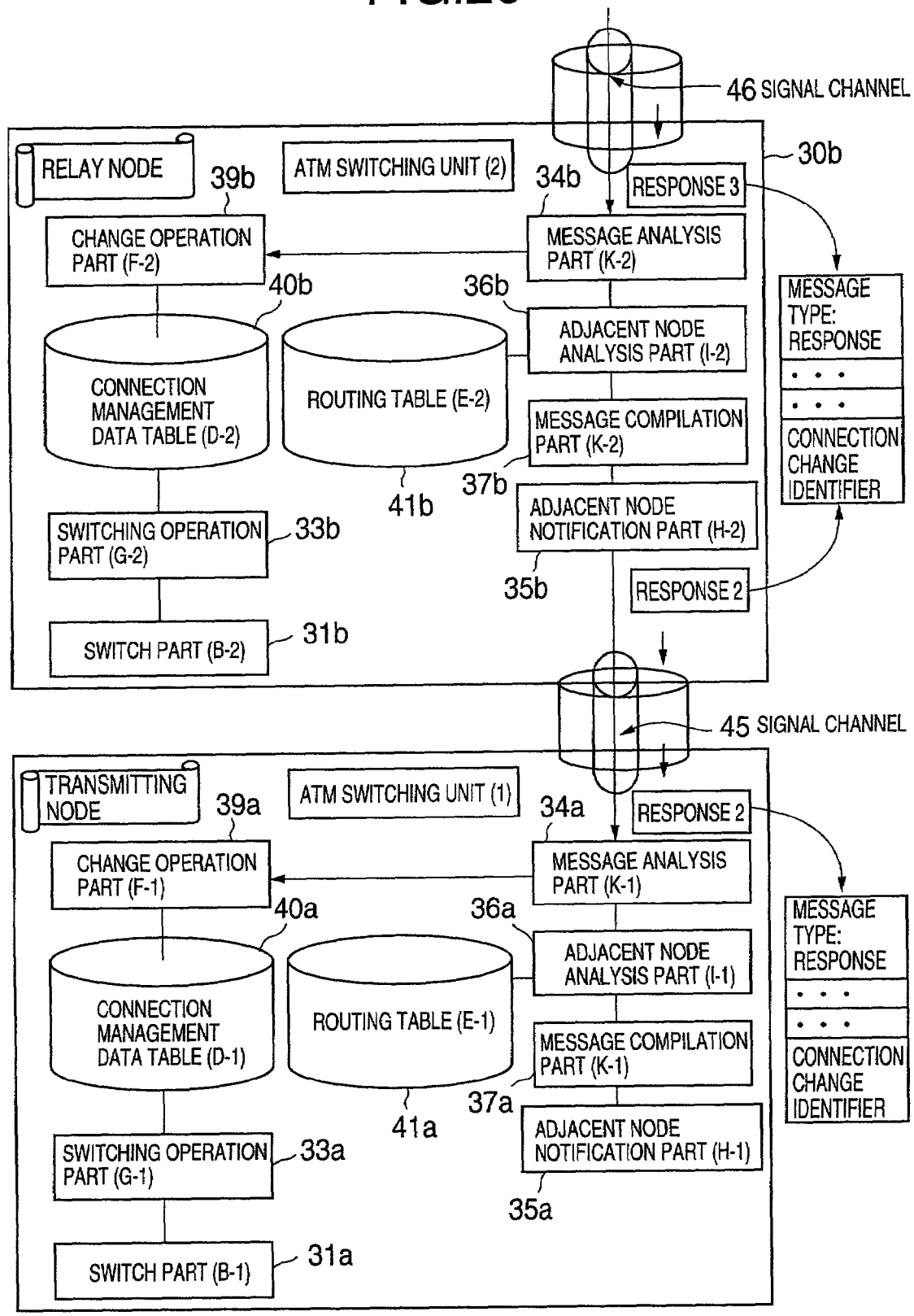
FIG. 20 is a diagram for illustrating the fourth embodiment of the switching unit of the present invention.

Next, a description will be given, with reference to FIGS. 19 through 23, of a fourth embodiment of the present invention. FIGS. 19 and 20 are diagrams for illustrating the fourth embodiment of the switching unit of the present invention. Each of the switching units 30a through 30c of FIGS. 19 and 20 has the same configuration as the switching unit of FIG. 4, and has its necessary parts for illustrating the fourth embodiment shown in the corresponding drawing.

Figure 21:
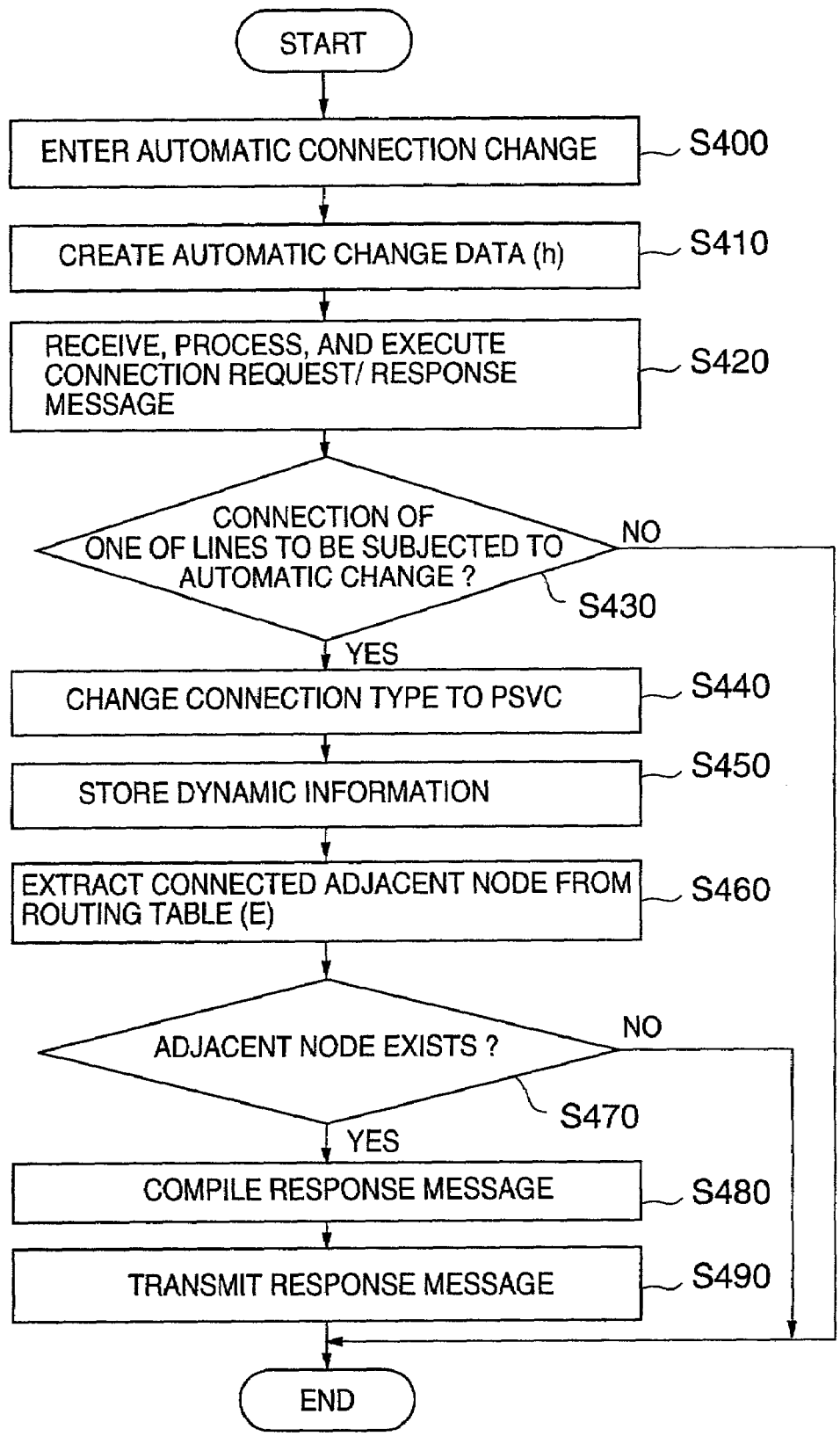
FIG. 21 is a flowchart of an operation process of an automatic connection change.

Here, a description will be given, with reference to the flowchart of FIG. 21, of operations performed by the switching units 30a through 30c of FIGS. 19 and 20 when an automatic connection change is performed. FIG. 21 is a flowchart of an operation process of the automatic connection change. The switching unit 30c of FIG. 19 is connected via the signal channel 46 to the switching unit 30b of FIG. 20.

In step S400, an automatic connection change is entered from an external input apparatus 50c connected to the switching unit 30c. The automatic connection change may be entered from the external input apparatus 50a connected to the switching unit 30a. In step S410 after step S400, automatic change data 64 as shown in FIG. 23 is created and entered.

FIG. 23 is a diagram showing a configuration of the automatic change data 64. The automatic change data 64 includes an automatic-change-enabled line number and an automatic change connection type. For instance, the automatic change connection type is SVC and SPVC in the automatic change data 64 of FIG. 23.

Figure 22:
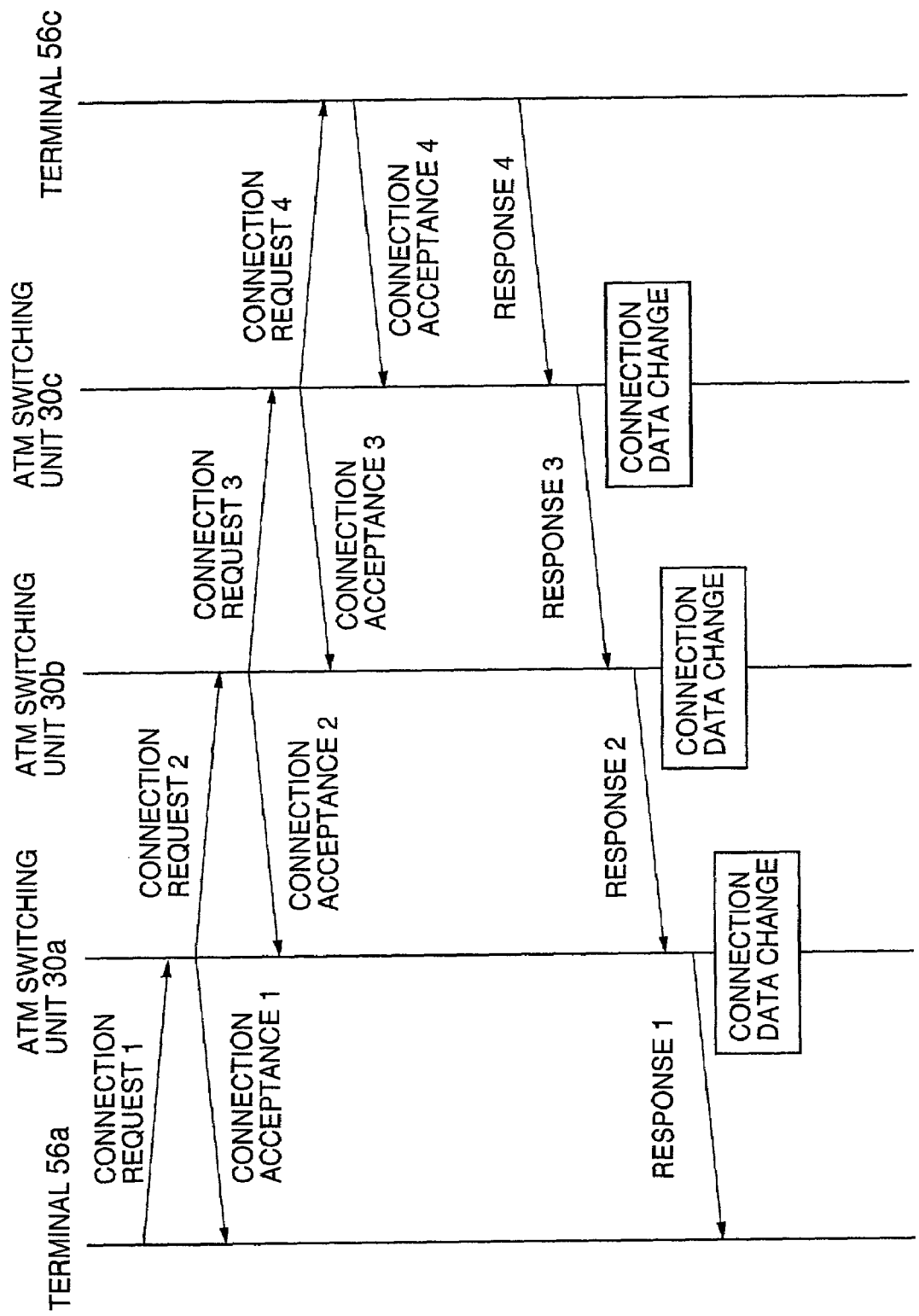
FIG. 22 is a diagram showing a sequence drawing for illustrating an operation process of the automatic connection change.

In step S420 after step S410, a connection operation for establishing connections by SVC/SPVC is performed. The operation of FIG. 420 is performed, for instance, in accordance with the procedure of a sequence drawing shown in FIG. 22. FIG. 22 is a diagram showing a sequence drawing for illustrating an operation process of the automatic connection change.

In the case of establishing connections between the terminals 56a and 56c, a connection request (a call connection request message) is transmitted from the terminal 56a via the switching units 30a through 30c to the terminal 56c so that the connection operation is performed. In the case of normal connection, the terminal 56c transmits a response message (a call connection confirmation message) to the switching unit 30c.

In step S430 after step S420, the switching unit 30c detects the response message supplied from the terminal 56c in a message analysis part 34c, and determines whether a line number relating to the connection operation is identical to the automatic-change-enabled line number included in the automatic change data.

If the switching unit 30c determines that the line number relating to the connection operation is identical to the automatic-change-enabled line number included in the automatic change data (YES in S430), step S440 is entered. If the switching unit 30c determines that the line number relating to the connection operation is not identical to the automatic-change-enabled line number included in the automatic change data (NO in S430), the operation is terminated.

In step S440, a connection type included in the connection management data 53 of the corresponding line number is changed to PSVC. In step S450 after step S440, the dynamic information 54 set in the dynamic connection of SVC/SPVC is stored.

In step S460 after step S450, adjacent node information is extracted based on the routing information of a routing table 41c. In step S470 after step S460, an adjacent node analysis part 36c determines based on the extracted adjacent node information whether the switching unit 30c has an adjacent node.

If the adjacent node analysis part 36c determines that the switching unit 30c has an adjacent node (YES in S470), the adjacent node analysis part 36c supplies information to that effect to a message compilation part 37c, and the operation of step S480 is performed. If the adjacent node analysis part 36c determines that the switching unit 30c has no adjacent node (NO in S470), the operation is terminated.

In step S480, the message compilation part 37c incorporates a connection change identifier into a response message transmitted to the adjacent node, and supplies the response message to an adjacent node notification part 35c. In step S490 after step S480, the adjacent node notification part 35c supplies the response message to the adjacent node of the switching unit 30b.

When the switching unit 30b detects the connection change identifier included in the supplied response message in the message analysis part 34b, through the same operations as steps S430 through S450, the connection management data 53 of corresponding line numbers is extracted from the connection management data table 40b in accordance with the supplied response message so that the connection management data 53 is altered.

Further, through the same operations as steps S460 through S490, it is determined whether the switching unit 30b has an adjacent node, and if the switching unit 30b has an adjacent node, a response message having a connection change identifier incorporated therein is supplied via the signal channel 45 to the switching unit 30a.

Accordingly, an automatic connection change operation can be performed on a plurality of nodes and the setting of the connection management data 53 can be simplified, thereby increasing convenience.

Figure 24:
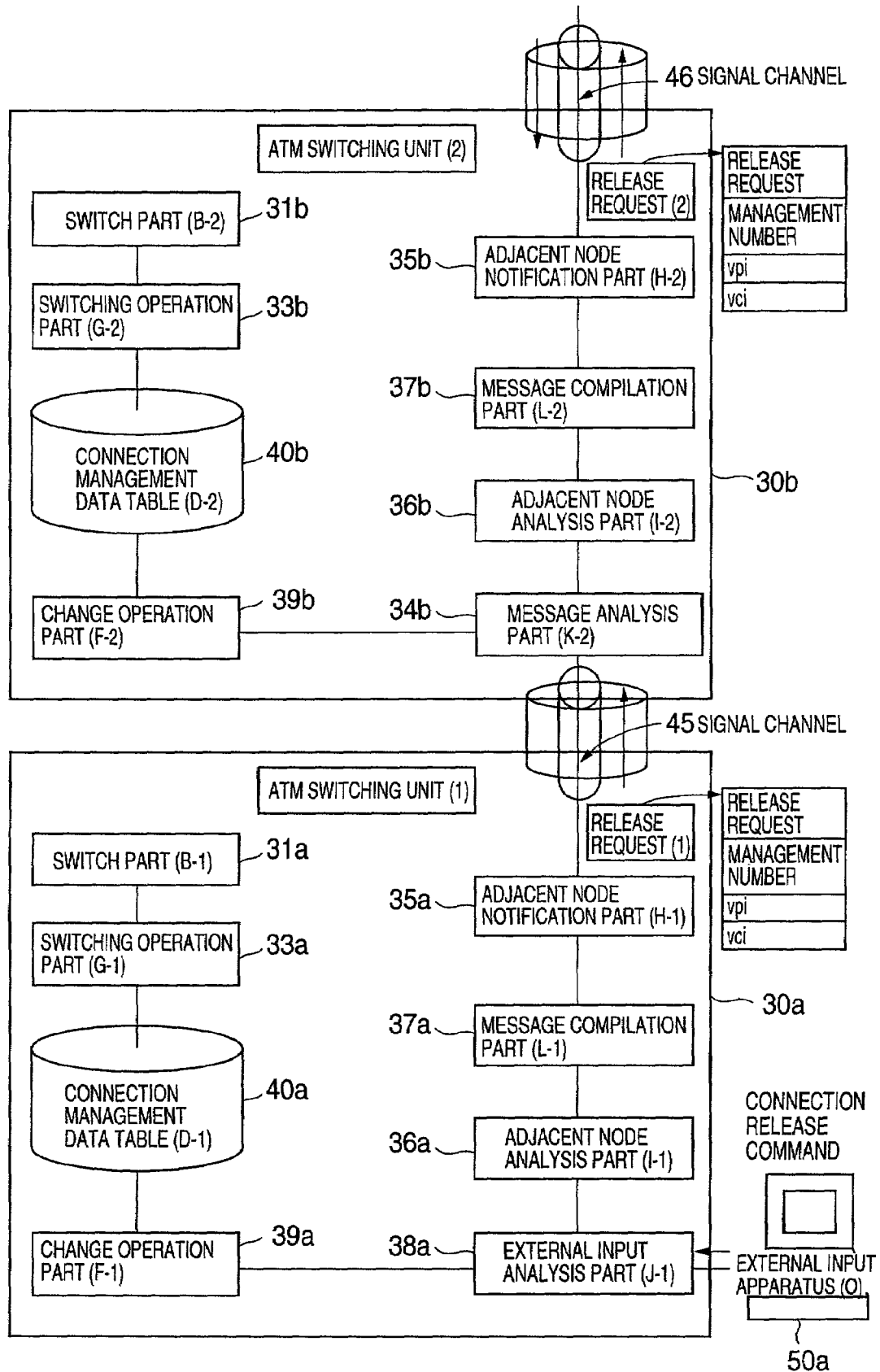
FIG. 24 is a diagram for illustrating a fifth embodiment of the switching unit of the present invention.
Figure 25:
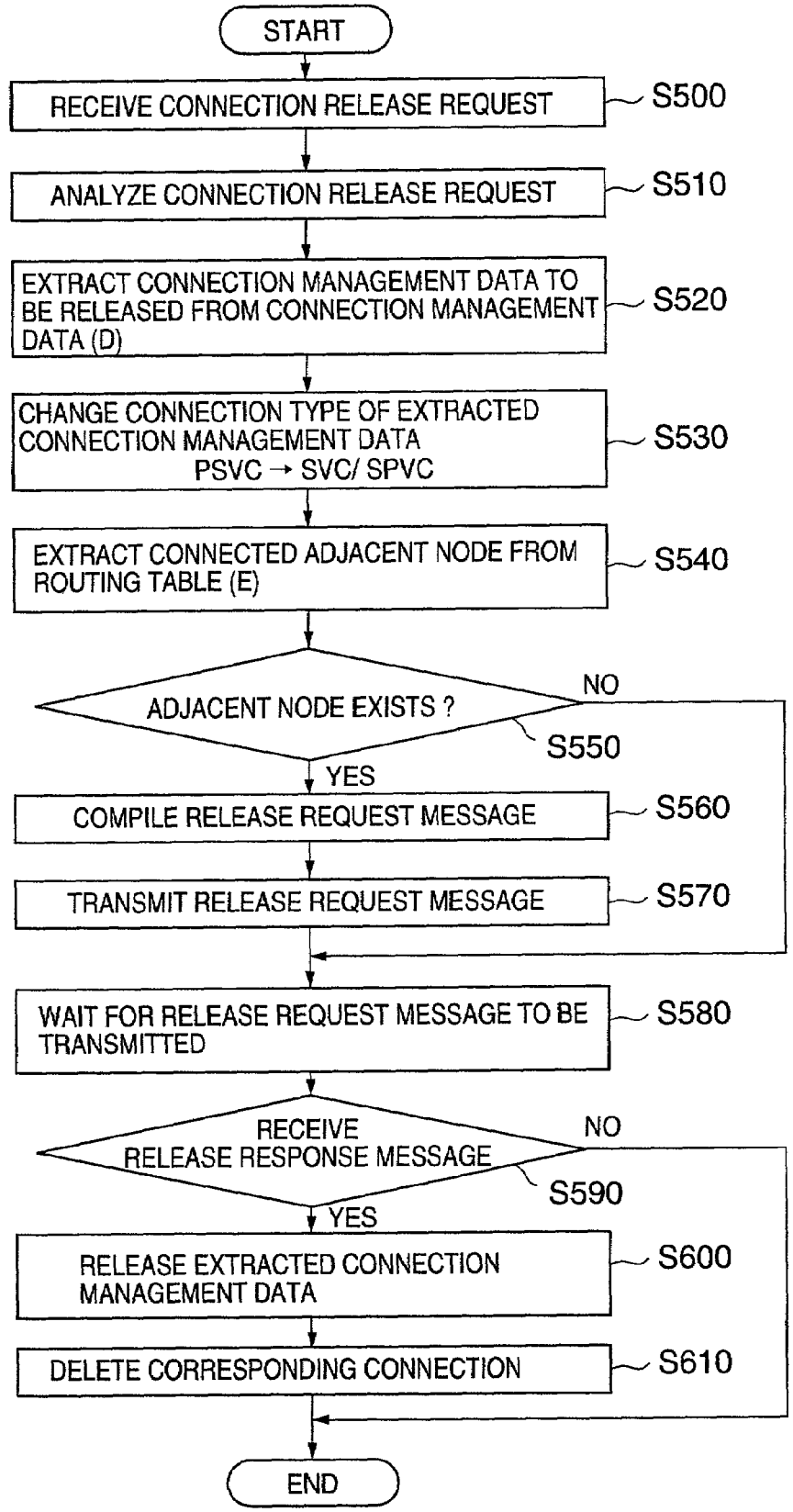
FIG. 25 is a flowchart of an operation process of a manual connection release.

Next, a description will be given, with reference to FIGS. 24 and 25, of a fifth embodiment of the present invention. FIG. 24 is a diagram showing the fifth embodiment of the switching unit of the present invention. Each of the switching units 30a and 30b has the same configuration as the switching unit of FIG. 4, and has its necessary parts for illustrating the fifth embodiment shown in the drawing.

Here, a description will be given, with reference to the flowchart of FIG. 25, of operations performed by the switching units 30a and 30b when a manual connection release is performed. FIG. 25 is a flowchart of an operation process of the manual connection release.

In step S500, a connection release request is input from the external input apparatus 50a connected to the switching unit 30a. The connection release request input to the external input apparatus 50a is supplied to the external input analysis part 38a. In step S510 after S500, the external input analysis part 38a analyzes the supplied connection release request, and supplies information on the analysis results to the change operation part 39a and the adjacent node analysis part 36a.

In step S520 after step S510, the change operation part 39a extracts the connection management data 53 of a corresponding line number from the connection management data table 40a in accordance with the supplied analysis results. In step S530 after step S520, the change operation part 39a changes a connection type included in the extracted connection management data 53 from PSVC that is a static connection to SVC/SPVC that is a dynamic connection.

In step S540, adjacent node information is extracted based on the routing information of the routing table 41a. In step S550 after step S540, the adjacent node analysis part 36a determines based on the extracted adjacent node information whether the switching unit 30a has an adjacent node.

If the adjacent node analysis part 36*a* determines that the switching unit 30*a* has an adjacent node (YES in S550), the adjacent node analysis part 36*a* supplies information to that effect to the message compilation part 37*a*, and the operation of step S560 is performed. If the adjacent node analysis part 36*a* determines that the switching unit 30*a* has no adjacent node (NO in S550), step S580 is entered.

In step S560, the message compilation part 37*a* edits a release request message, and supplies the release request message to the adjacent node notification part 35*a*. In step S570 after step S560, the adjacent node notification part 35*a* supplies the connection release request message via the signal channel 45 to the adjacent node (the switching unit 30*b* in FIG. 24, for instance). The connection release request message supplied from the adjacent node notification part 35*a* is formed, for instance, by setting the message type of the message of FIG. 13 to a release request.

In step S580, after transmitting the connection release request message to the switching unit 30*b*, the switching unit 30*a* waits to receive a release response message. In step S590 after step S580, the message analysis part 34*a* determines whether the release response message is received.

If the message analysis part 34*a* determines that the release response message is received (YES in S590), step S600 is entered so that the connection management data 53 extracted in step S520 is released. If the message analysis part 34*a* determines that no release response message is received (NO in S590), the operation is terminated. In step S610 after step S600, a corresponding connection is deleted.

When the switching unit 30*b* receives the release request message in the message analysis part 34*b*, a connection release operation is performed through the same operations as steps S510 through S610.

Figure 26:
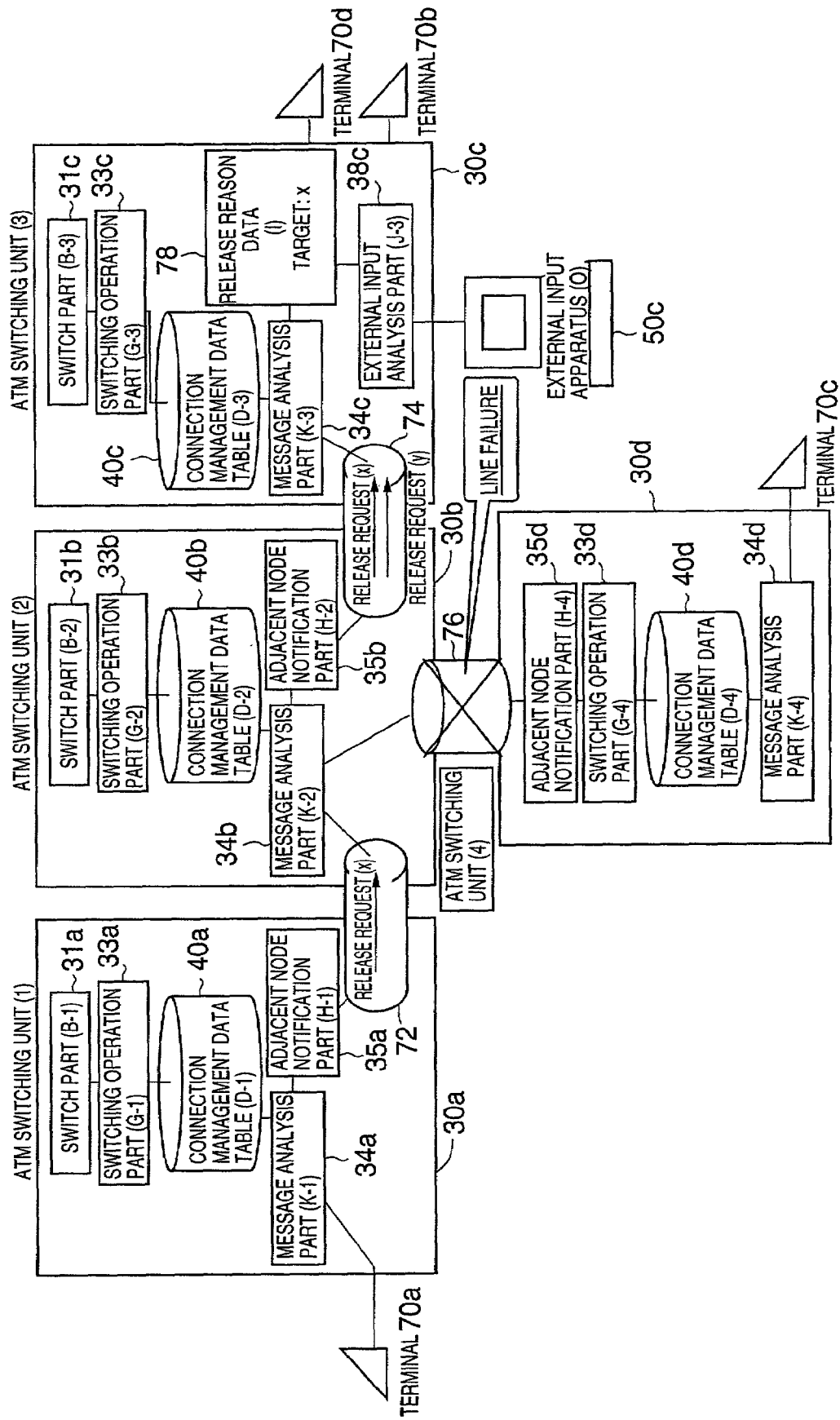
FIG. 26 is a diagram for illustrating a sixth embodiment of the switching unit of the present invention.

Next, a description will be given, with reference to FIGS. 26 through 30, of a sixth embodiment of the present invention. FIG. 26 is a diagram for illustrating the sixth embodiment of the switching unit of the present invention. Each of the switching units 30*a* through 30*d* and a switching unit 30*d* has the same configuration as the switching unit of FIG. 4, and has its necessary parts for illustrating the fifth embodiment shown in the drawing.

Figure 27:
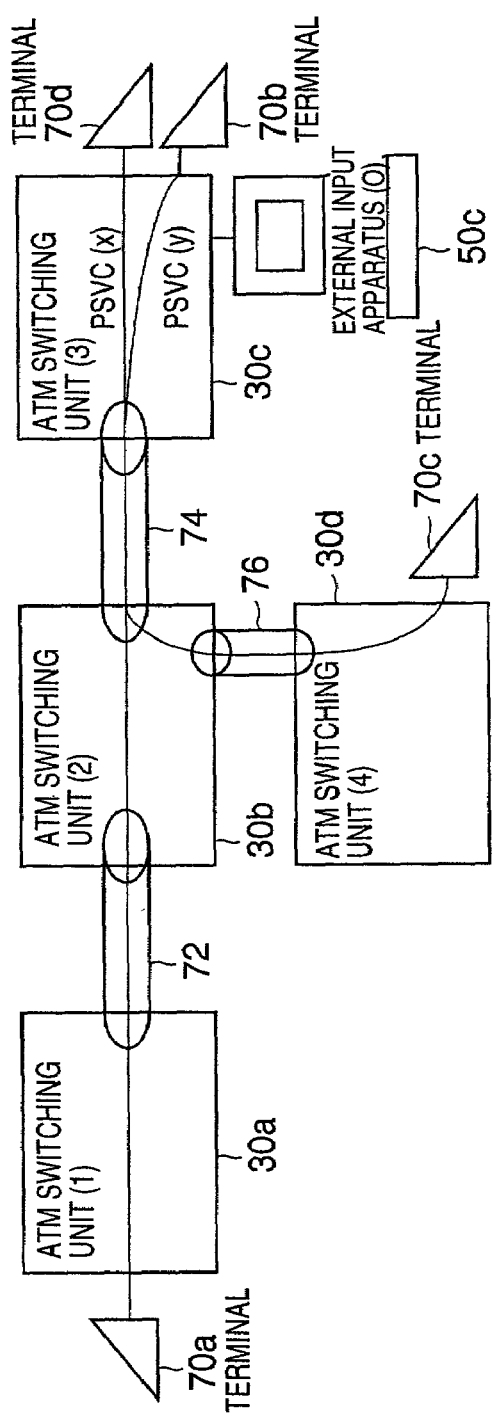
FIG. 27 is a diagram for illustrating an established connection.
Figure 29:
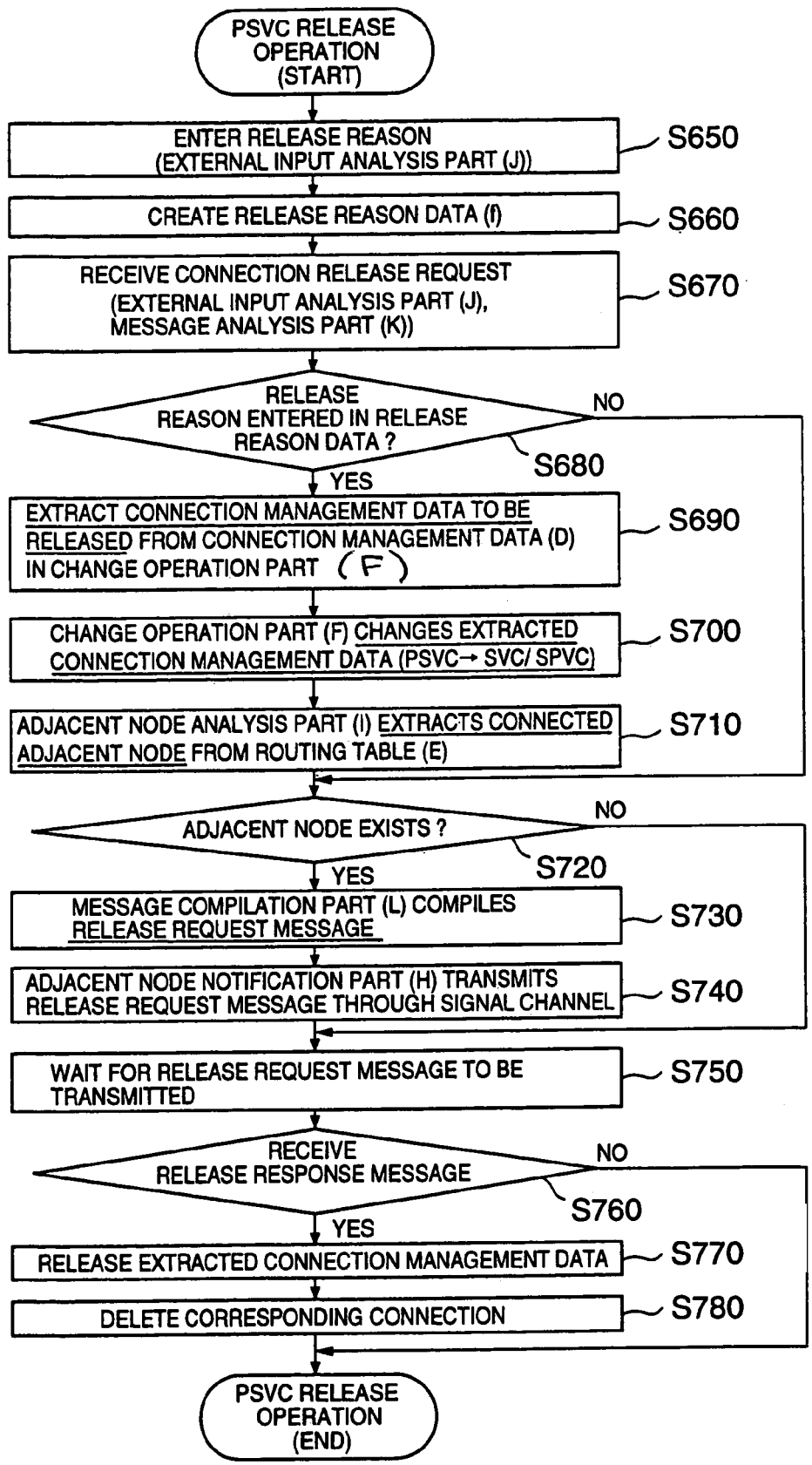
FIG. 29 is a flowchart of an operation process of an automatic connection release.

Here, a description will be given, with reference to the flowchart of FIG. 29, of operations performed by the switching units 30*a* through 30*d* when an automatic connection release is performed. FIG. 29 is a flowchart of an operation process of the automatic connection release. As shown in FIG. 27, with respect to the switching units 30*a* through 30*d*, a connection PSVC(x) is established between terminals 70*a* and 70*b* and a connection PSVC(y) is established between terminals 70*c* and 70*d*.

In step S650, a connection release reason is entered from the external input apparatus 50*c* connected to the switching unit 30*c*. In step S660 after step S650, release reason data 78 as shown in FIG. 30 is created and entered. FIG. 30 is a diagram showing a configuration of the release reason data 78. The release reason data 78 includes a target line number, a target connection type, and a valid release reason.

In step S670 after step S660, the message analysis part 34*c* of the switching unit 30*c* receives a connection release request. For instance, the message analysis part 34*c* receives a connection release request (x) of the connection PSVC(x) which is transmitted when the terminal 70*a* is disconnected normally or a connection release request (y) of the connection PSVC(y) which is transmitted when a system failure occurs in the switching unit 30*d* due to a line failure.

In step S680 after step S670, the message analysis part 34*c* analyzes the received connection release request and determines whether the connection release request corresponds to the valid release reason of the release reason data 78 entered in step S660.

If the message analysis part 34*c* determines that the connection release request corresponds to the valid release reason (YES in S680), in step S690, a change operation part 39*c* extracts the connection management data 53 of a corresponding line number from a connection management data table 40*c*. If the message analysis part 34*c* determines that the connection release request does not correspond to the valid release reason (NO in S680), step S720 is entered. For instance, in the case of the release reason data 78 of FIG. 26, a valid release reason x is set therein so that the connection release request (x) corresponds to the valid release reason, while the connection release reason (y) does not correspond to the valid release reason.

In step S700 after step S690, the change operation part 39*c* changes a connection type included in the extracted connection management data 53 from PSVC that is a static connection to SVC/SPVC that is a dynamic connection.

In step S710 after step S700, adjacent node information is extracted based on the routing information of the routing table 41*c*. In step S720 after step S710, the adjacent node analysis part 36*c* determines based on the extracted adjacent node information whether the switching unit 30*c* has an adjacent node.

If the adjacent node analysis part 36*c* determines that the switching unit 30*c* has an adjacent node (YES in step S720), the adjacent node analysis part 36*c* supplies information to that effect to the message compilation part 37*c*, and the operation of step S730 is performed. If the adjacent node analysis part 36*c* determines that the switching unit 30*c* has no adjacent node (NO in step S720), step S750 is entered.

In step S730, the message compilation part 37*c* edits a release request message and supplies the release request message to the adjacent node notification part 35*c*. In step S740 after step S730, the adjacent node notification part 35*c* supplies the connection release request message to the adjacent node.

In step S750, after transmitting the connection release request message to another switching unit, the switching unit 30*c* waits to receive a release response message. In step S760 after step S750, the message analysis part 34*c* determines whether the release response message is received.

If the message analysis part 34*c* determines that the release response message is received (YES in S760), in step S770, the connection management data 53 extracted in step S690 is released. If the message analysis part 34*c* determines that no release response message is received (NO in S760), the operation is terminated. In step S780 after step S770, a corresponding connection is deleted.

Figure 28:
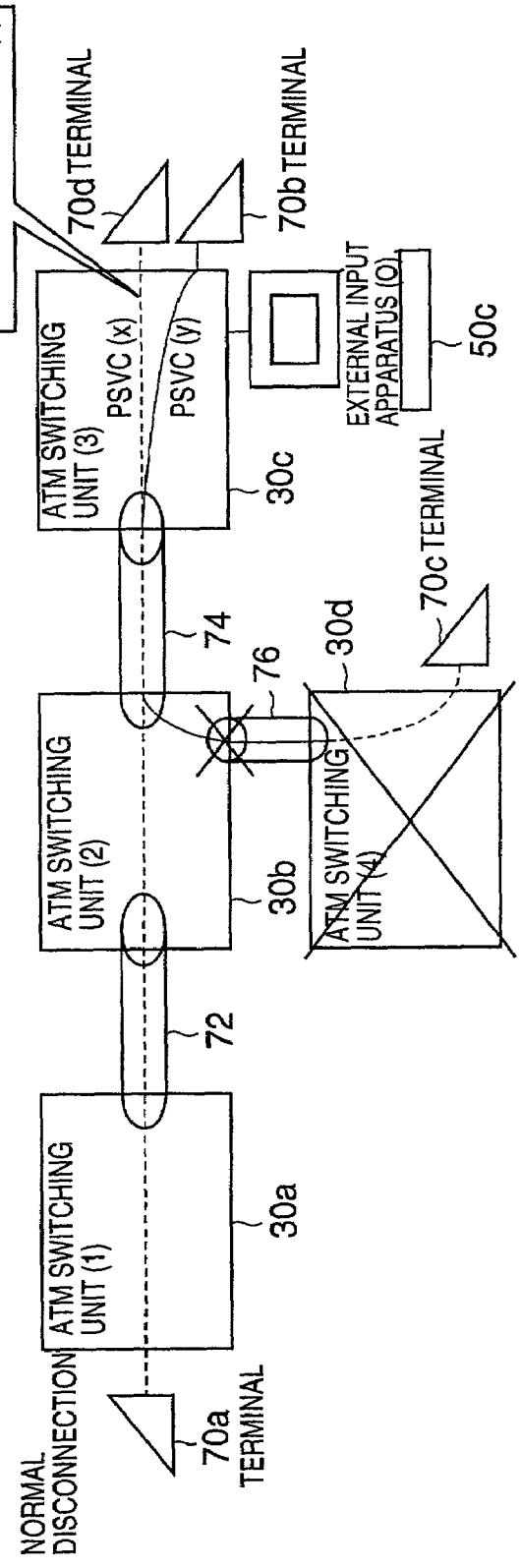
FIG. 28 is a diagram for illustrating a released connection.

In the case of FIG. 27, for instance, a connection release operation is performed by the connection release request (x) since the connection release request (x) corresponds to the valid release reason x, while no connection release operation is performed by the connection release request (y) since the connection release request (y) does not correspond to the valid release reason x. Therefore, as shown in FIG. 28, the connection PSVC(x) established between the terminals 70*a* and 70*b* is released, while the connection PSVC(y) established between the terminals 70*c* and 70*d* is not released.

Accordingly, the release operation is performable with respect only to a received release request message that corresponds to the entered valid release reason, and it can be determined based on a release reason whether to perform the release operation.

In the above-described embodiments, the connection management data table 40 corresponds to a connection data management part, the change operation part 39 corresponds to a change operation part and a release part, PSVC corresponds to a fixed connection type, SVC/SPVC corresponds to a variable connection type, the adjacent node analysis part 36 corresponds to first and second detection parts, the message compilation part 37 corresponds to first and second message compilation parts, the adjacent node notification part 35 corresponds to first and second transmission parts, the message analysis part 34 corresponds to first and second analysis parts, and the release reason data table 42 corresponds to a release reason storage part.

The present invention is not limited to the above-described embodiments, but variations and modifications may be made without departing from the scope of the present invention.

The invention claimed is:

1. A hardware connection data change device, comprising:
   a connection data management part configured to store and manage connection data on a connection of an associated switching unit, in which the connection data change device is provided, with an external switching unit; and
   a change operation part configured to change a type of the connection of the associated switching unit with the external switching unit in the connection data,
   wherein said change operation part changes the type of the connection to the external switching unit from a variable connection type to a fixed connection type in the connection data, upon receiving a request to change the type of the connection to the external switching unit in the connection data after the connection of the variable connection type to the external switching unit is dynamically set up, before the set-up connection is reset, and
   the connection data management part stores information on the connection of the variable connection type after the change operation part changes the type of the connection from the variable connection type to the fixed connection type in the connection data.

2. The connection data change device as claimed in claim 1, further comprising a release part configured to change the type of the connection with the external switching unit from the fixed connection type to the variable connection type in the connection data and to release the connection with the external switching unit.

3. The connection data change device as claimed in claim 2, further comprising:
   a detection part configured to detect the external connected switching unit;
   a message compilation part configured to generate a message controlling a release part of the detected external switching unit;
   a transmission part configured to transmit the message to the detected external switching unit; and
   an analysis part configured to receive an incoming message from the external switching unit and to analyze contents of the incoming message, the incoming message controlling the release part of the connection data change device.

4. The connection data change device as claimed in claim 2, further comprising a release reason storage part configured to store a valid release reason for releasing the connection with the external switching unit.

5. The connection data change device as claimed in claim 1, comprising:
   a detection part configured to detect the external connected switching unit;
   a message compilation part configured to generate a message controlling a change operation part of the detected external switching unit; and
   a transmission part configured to transmit the message to the detected external switching unit.

6. The connection data change device as claimed in claim 5, further comprising an analysis part configured to receive an incoming message from the external switching unit and to analyze contents thereof, the incoming message controlling the change operation part of the associated switching unit.

7. The connection data change device as claimed in claim 1, wherein said change operation part changes the type of the connection with the external switching unit to the fixed or variable connection type in accordance with a command input from an outside.

8. The connection data change device as claimed in claim 1, wherein the connection to the external switching unit is reset based on the stored information on the connection of the variable connection type if the type of the connection to the external switching unit in the connection data is the fixed connection type at a time of resetting the connection to the external switching unit.

9. A switching unit, comprising:
   a connection data management part configured to store and manage connection data on a connection with an external switching unit; and
   a change operation part configured to change a type of the connection with the external switching unit in the connection data,
   wherein said change operation part changes the type of the connection to the external switching unit from a variable connection type to a fixed connection type in the connection data, upon receiving a request to change the type of the connection to the external switching unit in the connection data after the connection of the variable connection type to the external switching unit is dynamically set up, before the set-up connection is reset, and
   the connection data management part stores information on the connection of the variable connection type after the change operation part changes the type of the connection from the variable connection type to the fixed connection type in the connection data.

10. The switching unit as claimed in claim 9, further comprising:
    a detection part configured to detect the external connected switching unit;
    a message compilation part configured to generate a message controlling a change operation part of the detected external switching unit;
    a transmission part configured to transmit the message to the detected external switching unit; and
    an analysis part configured to receive an incoming message from the external switching unit and to analyze contents thereof, the incoming message controlling the change operation part of the switching unit.

11. The switching unit as claimed in claim 9, further comprising:
    a release part configured to change the type of the connection with the external switching unit from the fixed connection type to the variable connection type in the connection data and to release the connection with the external switching unit; and a release reason storage part configured to store a valid release reason for releasing the connection with the external switching unit.

12. The switching unit as claimed in claim 9, wherein the connection to the external switching unit is reset based on the stored information on the connection of the variable connection type if the type of the connection to the external switching unit in the connection data is the fixed connection type at a time of resetting the connection to the external switching unit.

13. A connection data change method, comprising the steps of:
   dynamically setting up a connection of a variable connection type of a first switching unit with a second switching unit;
   extracting connection data on the connection of the first switching unit with the second switching unit;
   changing a type of the connection of the first switching unit with the second switching unit from the variable connection type to a fixed connection type in the extracted connection data, upon receiving a request to change the type of the connection of the first switching unit to the second switching unit in the extracted connection data, before the set-up connection is reset; and
   storing information on the connection of the variable connection type after the type of the connection is changed from the variable connection type to the fixed connection type in the extracted connection data.

14. The connection data change method as claimed in claim 13, wherein the connection of the first switching unit with the second switching unit is reset based on the stored information on the connection of the variable connection type if the type of the connection of the first switching unit with the second switching unit in the connection data is the fixed connection type at a time of resetting the connection of the first switching unit with the second switching unit.

* * * * *